(12) United States Patent
Sone et al.

(10) Patent No.: US 12,388,102 B2
(45) Date of Patent: Aug. 12, 2025

(54) FUEL CELL SYSTEM

(71) Applicant: Japan Aerospace Exploration Agency, Chofu (JP)

(72) Inventors: Yoshitsugu Sone, Chofu (JP); Motohiko Sato, Sagamihara (JP)

(73) Assignee: JAPAN AEROSPACE EXPLORATION AGENCY (JP)

( * ) Notice: Subject to any disclaimer, the term of this patent is extended or adjusted under 35 U.S.C. 154(b) by 467 days.

(21) Appl. No.: 17/797,864

(22) PCT Filed: Dec. 22, 2020

(86) PCT No.: PCT/JP2020/047959
§ 371 (c)(1),
(2) Date: Aug. 5, 2022

(87) PCT Pub. No.: WO2021/166428
PCT Pub. Date: Aug. 26, 2021

(65) Prior Publication Data
US 2023/0060926 A1    Mar. 2, 2023

(30) Foreign Application Priority Data

Feb. 17, 2020 (JP) ................. 2020-024704

(51) Int. Cl.
*H01M 8/1004* (2016.01)
*H01M 8/0289* (2016.01)
(Continued)

(52) U.S. Cl.
CPC ....... *H01M 8/1004* (2013.01); *H01M 8/0289* (2013.01); *H01M 8/04089* (2013.01);
(Continued)

(58) Field of Classification Search
CPC ............ H01M 8/1004; H01M 8/0289; H01M 8/04089; H01M 8/04231; H01M 8/0432;
(Continued)

(56) References Cited

U.S. PATENT DOCUMENTS

2004/0148859 A1* 8/2004 Kawamura ......... H01M 8/0668
48/128
2009/0269627 A1* 10/2009 Zhang ............... H01M 8/04089
429/423
(Continued)

FOREIGN PATENT DOCUMENTS

EP          1503444 A1    2/2005
JP         11281787 A    10/1999
(Continued)

OTHER PUBLICATIONS

International Search Report mailed Mar. 23, 2021 in corresponding PCT International Application No. PCT/JP2020/047959.

*Primary Examiner* — Stewart A Fraser
(74) *Attorney, Agent, or Firm* — OSTROLENK FABER LLP

(57) ABSTRACT

A fuel cell system includes: a fuel cell in which an electrolyte membrane is inserted between a fuel electrode and an oxidant electrode, hydrogen is supplied to a hydrogen supply unit of the fuel electrode, and a gas containing oxygen is supplied to a gas supply unit of the oxidant electrode so that power is generated; a hydrogen coating unit disposed to cover the fuel cell and configured to be filled internally with hydrogen; and a hydrogen introduction unit configured to introduce hydrogen into the hydrogen coating unit.

13 Claims, 13 Drawing Sheets

(51) Int. Cl.
  *H01M 8/04089* (2016.01)
  *H01M 8/04223* (2016.01)
  *H01M 8/0432* (2016.01)
  *H01M 8/04746* (2016.01)

(52) U.S. Cl.
  CPC ..... *H01M 8/04231* (2013.01); *H01M 8/0432* (2013.01); *H01M 8/04753* (2013.01)

(58) Field of Classification Search
  CPC ......... H01M 8/04753; H01M 8/04365; H01M 8/04731; H01M 16/006
  See application file for complete search history.

(56) References Cited

U.S. PATENT DOCUMENTS

| | | | |
|---|---|---|---|
| 2009/0269628 A1* | 10/2009 | Imanishi | H01M 8/04761 429/421 |
| 2011/0027667 A1* | 2/2011 | Sugimoto | H01M 8/2475 429/410 |
| 2016/0118679 A1* | 4/2016 | Joos | H01M 8/04753 429/415 |
| 2017/0155160 A1 | 6/2017 | Boehm | |

FOREIGN PATENT DOCUMENTS

| | | |
|---|---|---|
| JP | 2006329915 A | 12/2006 |
| JP | 2008027920 A | 2/2008 |
| JP | 2011027460 A | 2/2011 |
| JP | 2014191972 A | 10/2014 |
| JP | 2016166739 A | 9/2016 |
| JP | 2016535427 A | 11/2016 |
| JP | 2017517114 A | 6/2017 |
| JP | 2017139182 A | 8/2017 |
| JP | 2018078098 A | 5/2018 |
| WO | WO 2015/062154 A1 | 5/2015 |

* cited by examiner

FUEL CELL SYSTEM

The present application is a 35 U.S.C. § 371 national stage application of PCT/JP2020/047959, filed Dec. 22, 2020, which claims priority to Japanese Patent Application No. 2020-024704, filed Feb. 17, 2020, the contents of which are incorporated herein by reference.

TECHNICAL FIELD

The present invention relates to a fuel cell system.

BACKGROUND ART

Fuel cells are devices that directly convert chemical energy of fuels into electrical energy by causing fuels such as hydrogen to react with oxidants such as air (oxygen) electrochemically. Among fuel cells, solid polymer electrolyte fuel cells in which hydrogen ion-exchanged polymer membranes or the like are used in electrolytes have excellent characteristics of high output density, simple structures, and relatively low operation temperatures. Therefore, development of various technologies for fuel cells which can be mounted on mobile objects such as airplanes or vehicles is in progress.

As a fuel cell of the related art, for example, a water electrolysis/fuel cell power generation cell in which a first gas separator through which an oxygen-containing gas separated from liquid water passes and a second gas separator through which a hydrogen-containing gas separated from liquid water are laminated; a water flow passage through which water is supplied or discharged in a first direction substantially perpendicular to a cell lamination direction, an oxygen-containing gas flow passage through which the oxygen-containing gas is discharged or supplied in a second direction substantially perpendicular to the cell lamination direction, and a hydrogen-containing gas flow passage through which the hydrogen-containing gas is discharged or supplied in a third direction substantially perpendicular to the cell lamination direction are included; and an oxygen-side electrode layer and a hydrogen-side electrode layer are water-repellent electrode layers has been proposed (see Patent Literature 1).

In the fuel cell, water is supplied and discharged in the first direction substantially perpendicular to the lamination direction, oxygen gas and hydrogen gas are supplied and discharged in the second and third directions substantially perpendicular to the lamination direction, and a plurality of cells such as first and second cells are laminated. Thus, a compact dimension in the lamination direction can be implemented and a capability of a water electrolysis cell and a fuel cell power generation cell can be improved.

When a fuel cell stack that has the foregoing configuration is used in the vicinity of a nuclear reactor or in outer space where there is no atmosphere, radiation exposure or deterioration in an electrode or an ion exchange film may accelerate. When neutrons collide with atoms that have substantially the same mass at a low speed, γ rays are generated, and thus there is concern of damage occurring in devices in a facility.

Accordingly, to prevent radiation exposure, for example, a radiation shielding material in which zeolite with a high hydrogen content ratio, a heavy metal of an ion exchange element and an atomic number 40 or more having a high shielding effect against a high energy neutron ray and a gamma ray, and a thermal neutron absorber are combined has been proposed (see Patent Literature 2).

A neutron shielding material for curing an (A component) epoxy resin mixture in which a modified glycidyl ester-based epoxy resin and a bisphenol A-epichlorohydrin polymer are mixed, a (B component) amino-polyamide curing agent, a (C component) lithium-containing compound, a (D component) boron-containing compound, and an (E component) aluminum hydroxide containing compound has been proposed (see Patent Literature 3).

CITATION LIST

Patent Literature

[Patent Literature 1]
Japanese Unexamined Patent Application, First Publication No. 2018-78098
[Patent Literature 2]
Japanese Unexamined Patent Application, First Publication No. 2006-329915
[Patent Literature 3]
Japanese Unexamined Patent Application, First Publication No. 2011-27460

SUMMARY OF INVENTION

Technical Problem

However, a fuel cell system capable of implementing a high neutron-shielding effect and simplicity, weight reduction, and space reduction of a system in consideration of mounting on a mobile object such as an investigation vehicle (rover) used on the lunar surface or the like is required.

An objective of the present invention is to provide a fuel cell system capable of implementing a high neutron-shielding effect and simplicity, weight reduction, and space reduction of a system.

Solution to Problem

To achieve the foregoing objective, the present invention provides the following means.

[1] A fuel cell system includes: a fuel cell in which an electrolyte membrane is inserted between a fuel electrode and an oxidant electrode, hydrogen is supplied to a hydrogen supply unit of the fuel electrode, and a gas containing oxygen is supplied to a gas supply unit of the oxidant electrode so that power is generated; a hydrogen coating unit disposed to cover the fuel cell and configured to be filled internally with hydrogen; and a hydrogen introduction unit configured to introduce hydrogen into the hydrogen coating unit.

[2] The fuel cell system according to [1] may further include a hydrogen discharge unit configured to discharge hydrogen from the hydrogen coating unit. An inner space of the hydrogen coating unit may communicate with the hydrogen supply unit. Hydrogen may be supplied to the hydrogen supply unit by introducing the hydrogen from the hydrogen introduction unit and the hydrogen coating unit.

[3] The fuel cell system according to [1] may further include a neutron shielding member provided between the hydrogen coating unit and the fuel cell.

[4] In the fuel cell system according to [3], the neutron shielding member may be formed of a material containing a heavy metal.

[5] The fuel cell system according to [1] may further include a port configured to communicate with the fuel cell and discharge water generated in the fuel cell to the outside of the hydrogen coating unit.

[6] In the fuel cell system according to [3], a downstream end portion of the port may have a capillary shape.

[7] The fuel cell system according to [5] may further include a moisture absorption member mounted on the fuel cell. An upstream end portion of the port may come into contact with or be disposed near the moisture absorption member.

[8] In the fuel cell system according to [1], an inside of the hydrogen coating unit may be maintained in a state in which pressurization is achieved by hydrogen.

[9] The fuel cell system according to [1] may further include a dehumidifier connected to a gas discharge passage of the gas supply unit and configured to be switchable from one water recovery tank to another water recovery tank. The water recovery tank may be switched based on a product of a current value and a conduction time to a load connected to the fuel cell.

[10] The fuel cell system according to [1] may further include a temperature measurement unit configured to measure a temperature of the fuel cell and a temperature adjustment unit configured to perform temperature regulation of the fuel cell.

[11] The fuel cell system according to [1] may further include a battery electrically connected to the fuel cell in parallel.

[12] In the fuel cell system according to [1], the fuel electrode, the electrolyte membrane, and the oxidant electrode may be laminated in that order in a vertical direction.

[13] In the fuel cell system according to [12], the fuel electrode may be disposed below the electrolyte membrane.

Advantageous Effects of Invention

According to the present invention, it is possible to implement a high neutron-shielding effect and simplicity, weight reduction, and space reduction of a system.

DESCRIPTION OF EMBODIMENTS

Hereinafter, embodiments of the present invention will be described in detail with reference to the drawings.

[Configuration of Fuel Cell System]

Figure 1:
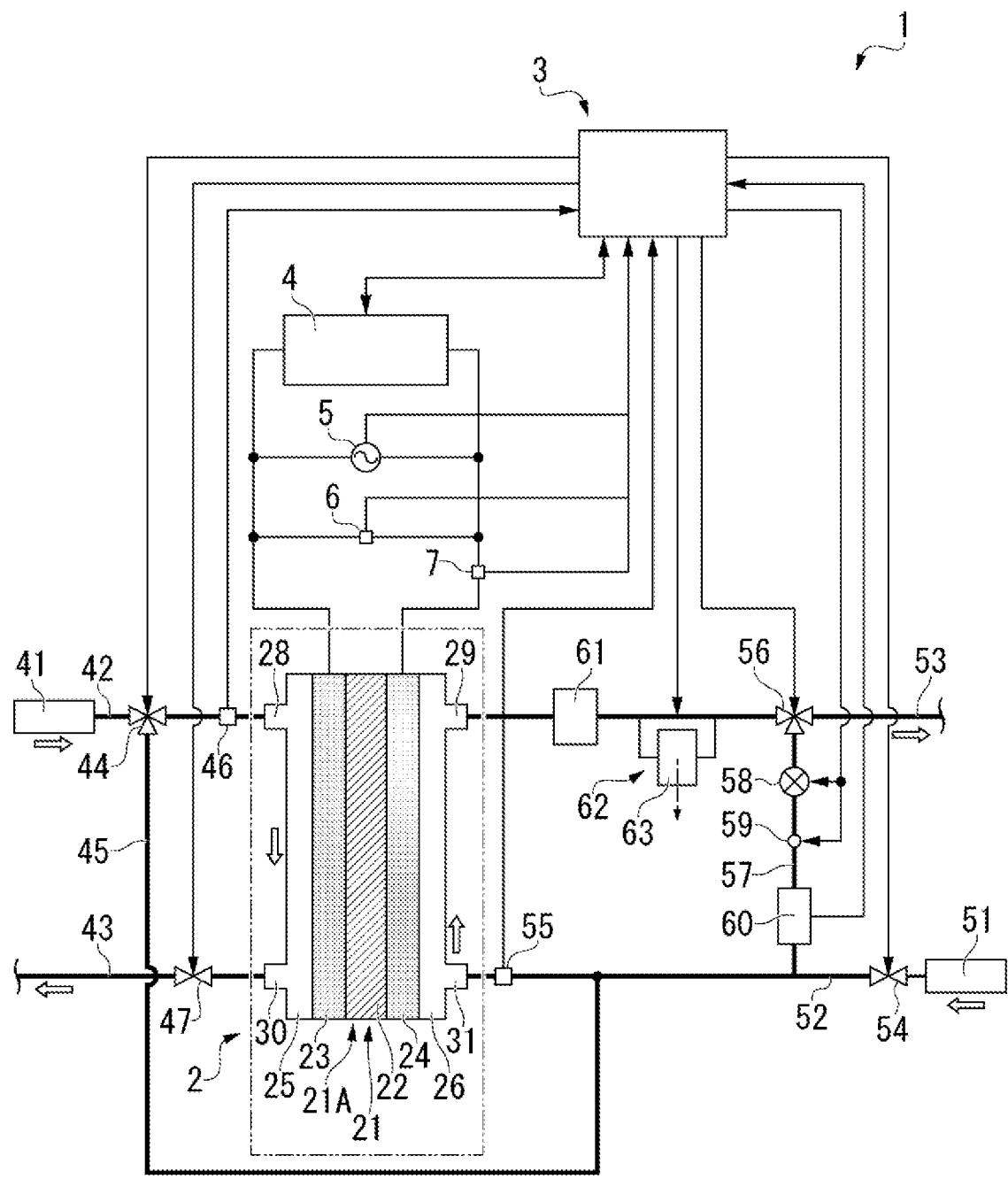
FIG. 1 is a diagram schematically illustrating an example of a configuration of a fuel cell system to which a method of controlling a fuel cell device according to a first embodiment of the present invention is applied.
Figure 2A:
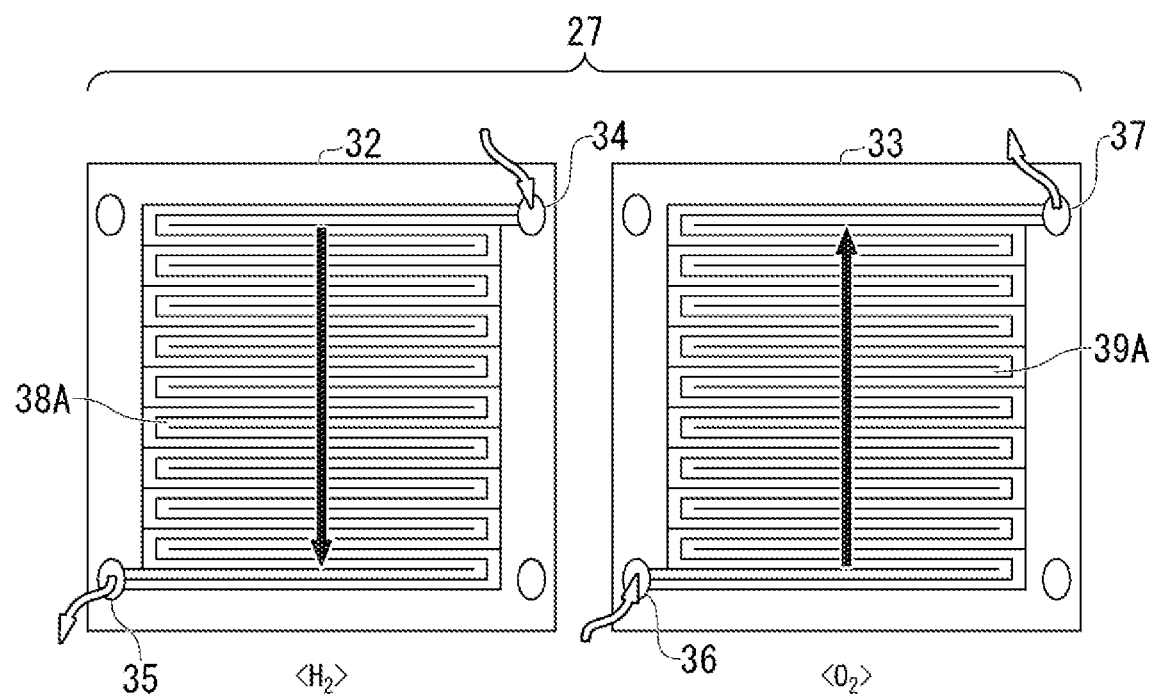
FIG. 2A is a side view illustrating examples of a hydrogen supply unit and an oxygen supply unit of a separator in FIG. 1.

FIG. 1 is a diagram schematically illustrating an example of a configuration of a fuel cell system to which a method of controlling a fuel cell device according to a first embodiment of the present invention is applied. FIG. 2A is a side view illustrating examples of a hydrogen supply unit and an oxygen supply unit (a gas supply unit) of a separator in FIG. 1. In the drawings used in the following description, to facilitate understanding of characteristics, characteristic portions are enlarged for convenience in some cases, and the shapes, dimensions, ratios, and the like of constituent elements are not limited to the illustrated constituent elements.

As illustrated in FIG. 1, a fuel cell system 1 includes a fuel cell device 2 and a control unit 3 that generally controls the fuel cell device 2 by transmitting and receiving signals to and from various devices to be described below.

In the fuel cell device 2, a fuel cell stack 21 is provided. The fuel cell stack 21 has a configuration in which a plurality of fuel cells 21A that each include an electrolyte membrane 22, a fuel electrode 23, an oxidant electrode 24, a hydrogen supply unit 25, and an oxygen supply unit 26 are laminated in a separator 27 (see FIG. 2A). In the embodiment, to facilitate description, a case in which the fuel cell stack 21 is configured with one fuel cell 21A will be described.

A hydrogen supply port 28 and an oxygen discharge port 29 are respectively provided in the upper portions the fuel electrode 23 and the oxidant electrode 24. A hydrogen discharge port 30 and an oxygen supply port 31 are respectively provided in the lower portions of the fuel electrode 23 and the oxidant electrode 24.

Figure 2B:
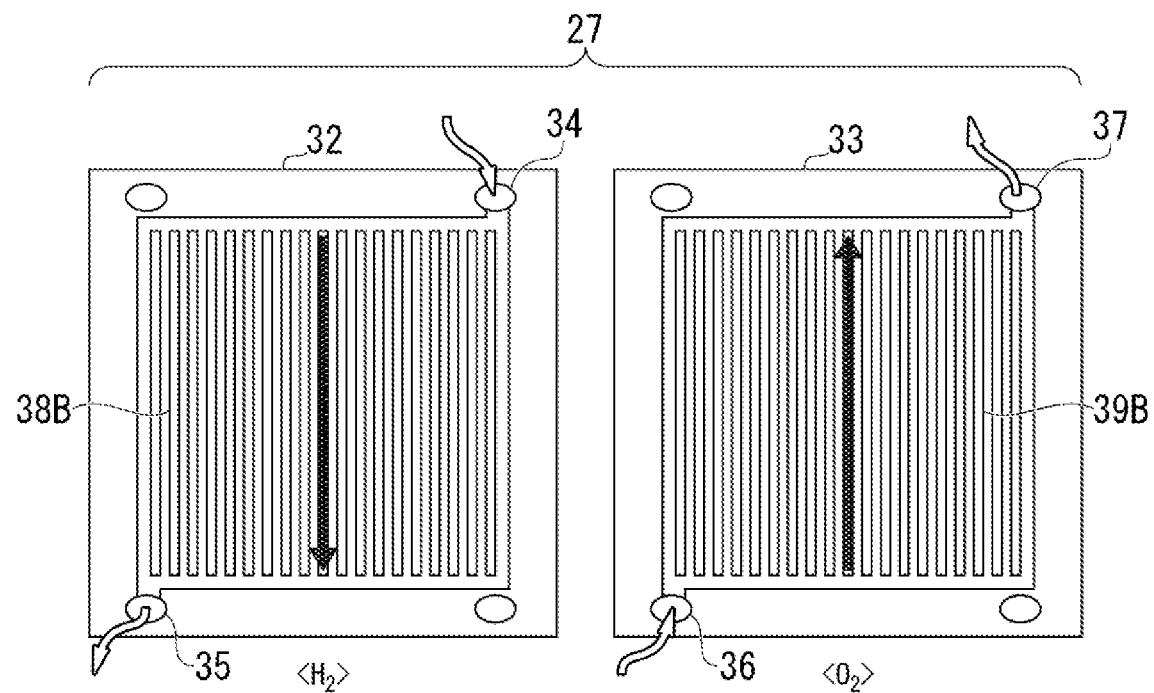
FIG. 2B is a diagram illustrating a modified example of flow passage patterns in FIG. 2A.

As illustrated in FIG. 2A, the separator 27 is formed in a flat plate shape and includes a fuel electrode side portion 32 on the front side and an oxidant electrode side portion 33 on the rear side. In the fuel electrode side portion 32, a hydrogen inlet 34 corresponding to the hydrogen supply port 28 and a hydrogen outlet 35 corresponding to the hydrogen discharge port 30 are provided. In the oxidant electrode side portion 33, an oxygen inlet 36 corresponding to the oxygen supply port 31 and an oxygen outlet 37 corresponding to the oxygen discharge port 29 are provided. Flow passage patterns 38A and 39A of the fuel electrode side portion 32 and the oxidant electrode side portion 33 each have, for example, a serpentine shape and are formed so that directions (black thick arrows in FIG. 2A) of overall flows of hydrogen flowing in the fuel electrode side portion 32 and oxygen flowing in the oxidant electrode side portion 33 are opposite to each other. As illustrated in FIG. 2B, flow passage patterns 38B and 39B may have a pectinate shape (a straight shape). In this shape, directions (black thick arrows in FIG. 2B) of overall flows of hydrogen flowing in the fuel electrode side portion 32 and oxygen flowing in the oxidant electrode side portion 33 are opposite to each other.

In the fuel cell system 1, a hydrogen supply source 41, a hydrogen introduction passage 42 that supplies hydrogen from the hydrogen supply source 41 to the fuel cell device 2, and a hydrogen discharge passage 43 that discharges the hydrogen from the fuel cell device 2 are provided (see FIG. 1). The hydrogen introduction passage 42 is connected to the hydrogen supply port 28 and the hydrogen discharge passage 43 is connected to the hydrogen discharge port 30. In the fuel cell system 1, an oxygen supply source 51, an oxygen introduction passage 52 (a gas introduction passage) that supplies a gas (for example, oxygen) from the oxygen supply source 51 to the fuel cell device 2, and an oxygen discharge passage 53 (a gas discharge passage) that discharges the gas from the fuel cell device 2 are provided. The oxygen introduction passage 52 is connected to the oxygen supply port 31 and the oxygen discharge passage 53 is connected to the oxygen discharge port 29.

In the hydrogen introduction passage 42, a three-way valve 44 is provided. The hydrogen introduction passage 42 is connected to the oxygen introduction passage 52 via a connection flow passage 45. The hydrogen introduction passage 42 is configured so that hydrogen can be supplied to the hydrogen supply unit 25 and hydrogen can also be supplied to the oxygen supply unit 26 via the connection flow passage 45, as necessary. In the hydrogen introduction passage 42, a hydrogen pressure measurement unit 46 that measures pressure (for example, gauge pressure) of hydrogen supplied to the hydrogen supply unit 25 is provided.

In the hydrogen discharge passage 43, a valve 47 that performs opening/blocking of a flow passage is provided and is configured so that discharging (purging) of hydrogen to the outside or stopping of the discharging can be performed.

In the oxygen introduction passage 52, a valve 54 that performs opening/blocking of a flow passage is provided and is configured so that supplying/stopping of oxygen can be performed. In the oxygen introduction passage 52, a gas pressure measurement unit 55 that measures pressure (for example, gauge pressure) of a gas supplied to the oxygen supply unit 26 is provided.

In the oxygen discharge passage 53, a three-way valve 56 is provided. The oxygen discharge passage 53 is connected to the oxygen introduction passage 52 via a circulation passage 57. The oxygen discharge passage 53 is configured so that a gas can be discharged (purged) to the outside and the gas can be returned to the oxygen supply unit 26 via the circulation passage 57 as necessary. That is, in the embodiment, the oxygen introduction passage 52, the oxygen supply unit 26, the oxygen discharge passage 53, and the circulation passage 57 form a circulation line. In the circulation passage 57, a circulation pump 58, a pressure adjustment unit 59, and a flow rate measurement unit 60 are provided, and thus sending, depressurization/boosting, and flow rate measurement of a gas (for example, oxygen) are performed. The amount of gas consumed in the fuel cell system 1 can be measured by, for example, the flow rate measurement unit 60. The circulation amount of oxygen can be adjusted based on a measured value of the amount of gas using the circulation pump 58. In the embodiment, the circulation pump 58 is provided in the circulation passage 57, but the present invention is not limited thereto. The circulation pump 58 may be provided at any position on the circulation line, such as the oxygen discharge passage 53.

In the oxygen discharge passage 53, a condenser 61 and a dehumidifier 62 are provided. The condenser 61 condenses moisture in the gas flowing in the oxygen discharge passage 53. The dehumidifier 62 removes the moisture from the gas passing through the condenser 61 and recovers the moisture from a water recovery tank 63. The details of a configuration of the dehumidifier 62 will be described below.

Figure 3:
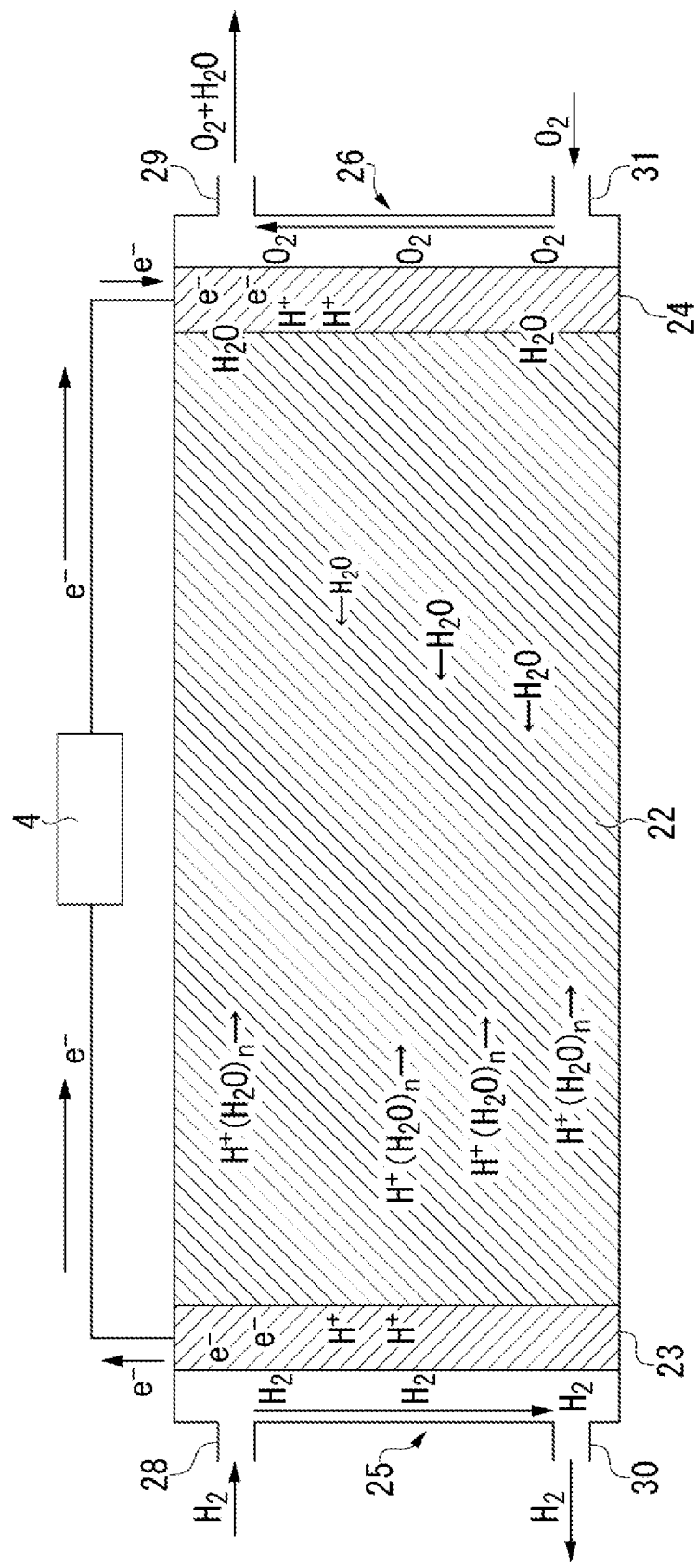
FIG. 3 is a diagram illustrating a water movement model inside a fuel cell stack in FIG. 1.

In the fuel cell device 2, hydrogen (preferably, pure hydrogen) is used as a reductant (fuel). As the oxidant, a gas containing oxygen, for example, oxygen (preferably, pure oxygen) or air, is used. Hereinafter, the gas containing oxygen is simply referred to as a "gas." Hydrogen is supplied to the side of the fuel electrode 23 via the hydrogen supply port 28 and the gas is supplied to the side of the oxidant electrode 24 via the oxygen supply port 31. The hydrogen and the gas supplied to the inside of the fuel cell stack 21 flow along the electrolyte membrane 22 in mutually opposite directions. Water generated on the oxygen side during reaction of the hydrogen and the gas is moved and diffused through the electrolyte membrane 22, as illustrated in FIG. 3, and the water is supplied to the hydrogen side. Thus, the hydrogen near the hydrogen supply port 28 is humidified. The humidified hydrogen flows in a direction opposite to the flow of the gas, the water vapor amount becomes abundant with consumption of the hydrogen, movement of moisture from the hydrogen side to the oxygen side occurs near the hydrogen discharge port 30, and thus the vicinity of the oxygen supply port 31 is humidified. As a result, inside the fuel cell stack 21, the moisture mutually moves between the gas side and the hydrogen side via the electrolyte membrane 22.

In the fuel cell 21A, the electrolyte membrane 22 is inserted between the fuel electrode 23 and the oxidant electrode 24, hydrogen is supplied to the hydrogen supply unit 25 of the fuel electrode 23, and a gas is supplied to the oxygen supply unit 26 of the oxidant electrode 24 so that power is generated. The fuel cell device 2 is electrically connected to a load 4 of a mobile object such as a vehicle to supply power to the load 4.

[Hydrogen Coating Unit]

Figure 11:
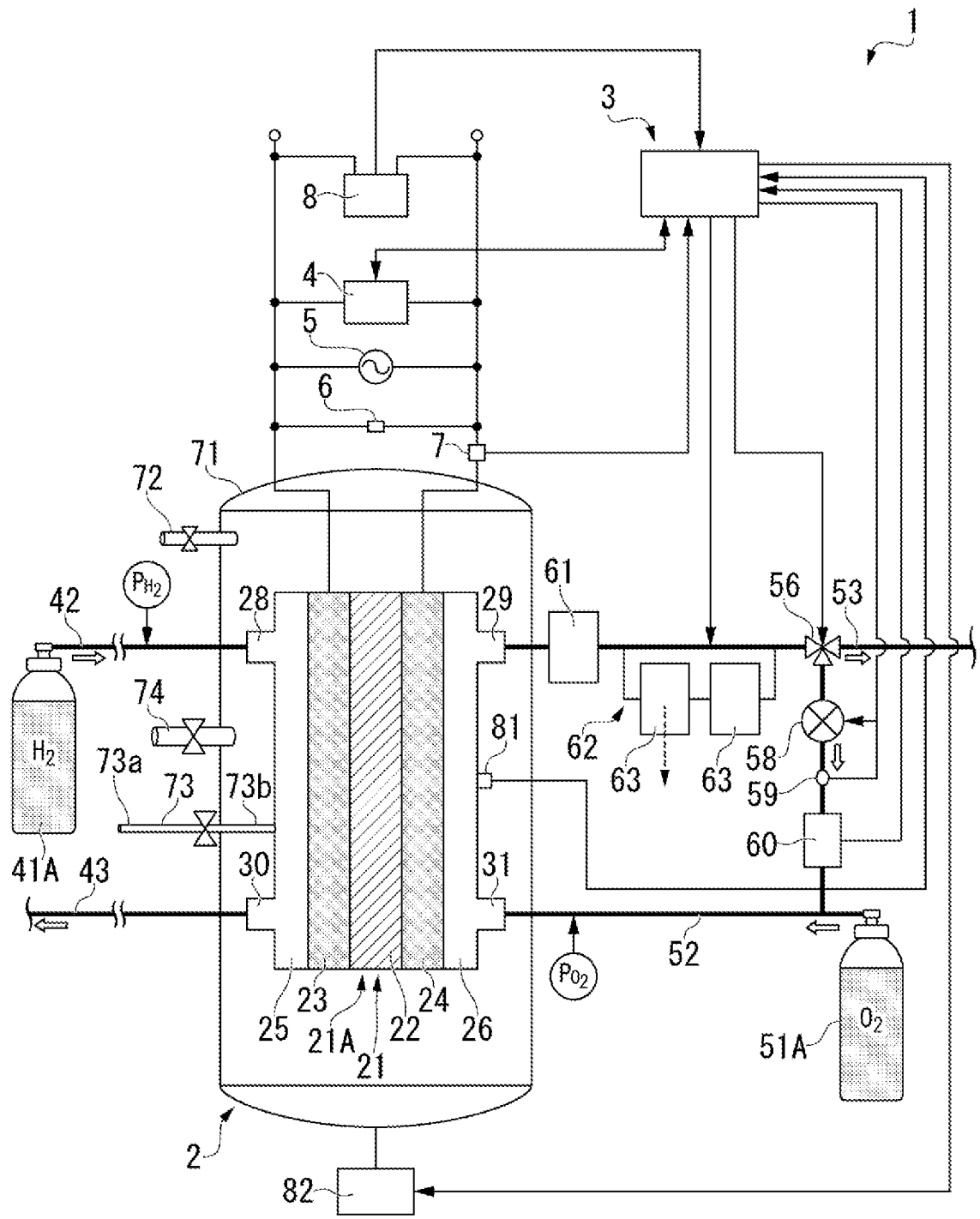
FIG. 11 is a diagram schematically illustrating a configuration of a fuel cell system including a hydrogen coating unit according to a second embodiment of the present invention.

FIG. 11 is a diagram schematically illustrating a configuration of a fuel cell system including a hydrogen coating unit according to a second embodiment of the present invention. The fuel cell system 1 in FIG. 11 includes hydrogen coating unit which is mainly different from the fuel cell system 1 in FIG. 1. The configuration of the fuel cell system 1 in FIG. 11 is basically the same as the configuration of the fuel cell system 1 in FIG. 1, and other portions will be described below.

As illustrated in FIG. 11, the fuel cell device 2 according to the embodiment includes the fuel cell stack 21, a hydrogen coating unit 71 that is disposed to cover the fuel cell stack 21 and is configured so that the inside is filled with hydrogen, and a hydrogen introduction unit 72 in which hydrogen is introduced to the hydrogen coating unit 71.

The hydrogen coating unit 71 is a container that accommodates the fuel cell device 2 in an inner space and is able to seal the inner space. The hydrogen coating unit 71 has any of various shapes such as a rectangular parallelopiped shape or a cylindrical shape. A bag shape or a barrel shape is preferable from the viewpoint of strength. The hydrogen coating unit 71 is preferably formed of a material with which neutrons can be shielded and is formed of, for example, metal such as aluminum. The inside of the hydrogen coating unit 71 is preferably maintained in a state in which pressurization is achieved by hydrogen. Thus, even when minute crack or the like occurs in the hydrogen coating unit 71, a hydrogen-filled state can be maintained.

The hydrogen introduction unit 72 is connected to, for example, another system and supplies hydrogen from a hydrogen supply source provided in the other system to the hydrogen coating unit 71. The hydrogen introduction unit 72 may be connected to a hydrogen tank 41A serving as a hydrogen supply source. In this case, hydrogen from the hydrogen tank 41A can be supplied to one or both of the hydrogen supply unit 25 and the hydrogen coating unit 71. In the embodiment, an oxygen tank 51B serving as a gas supply source is provided, and oxygen of the oxygen tank 51B is supplied to the oxygen introduction passage 52.

The fuel cell device 2 includes a capillary port (port) 73 that communicates with the fuel cell stack 21 and discharges water generated inside the fuel cell stack 21 to the outside of the hydrogen coating unit 71 and a purge port 74 that is provided in the hydrogen coating unit 71 and is able to open the inner space of the hydrogen coating unit 71. The capillary port 73 is opened to, for example, the outer space. When flushing occurs or a tendency of the flooding emerges, an unnecessary gas or moisture inside the hydrogen coating unit 71 is discharged to the outer space by opening a valve provided in the capillary port 73. In the capillary port 73, at least a downstream tip end portion 73a preferably has a capillary shape. Thus, sudden purge can be inhibited and a gas can be gradually discharged to the outer space. The purge port 74 is opened to, for example, the outer space. In a case in which safety guarantee is necessary or in emergency, the gas or the like inside the hydrogen coating unit 71 can be purged as quickly as possible by opening or breaking a valve provided in the purge port 74.

Figure 12:
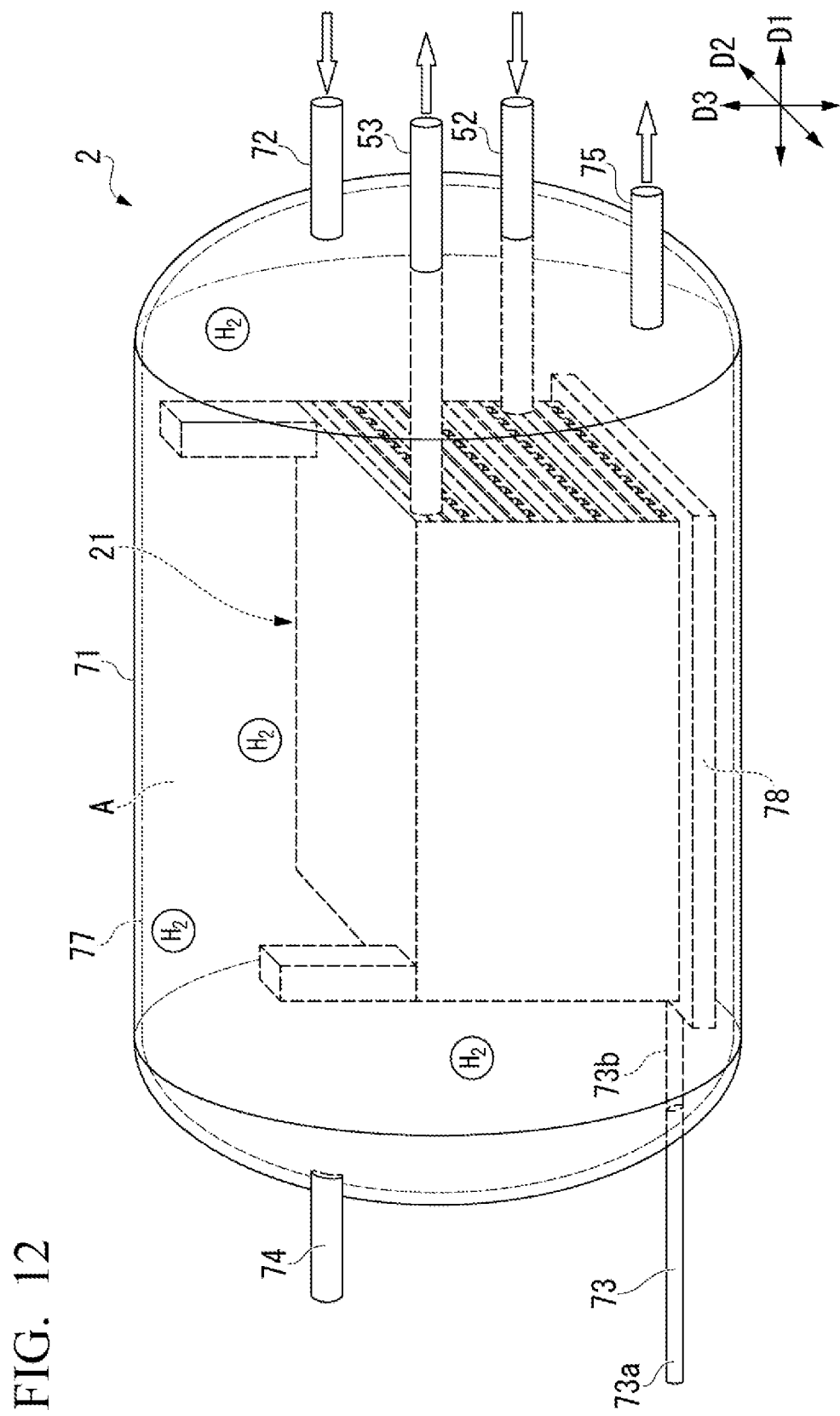
FIG. 12 is a diagram illustrating a modified example of a configuration of a fuel cell device in FIG. 11.

FIG. 12 is a diagram illustrating a modified example of a configuration of the fuel cell device 2 in FIG. 11.

As illustrated in FIG. 12, the fuel cell device 2 according to a modified example includes the hydrogen coating unit 71, the hydrogen introduction unit 72, and a hydrogen discharge unit 75 that discharges hydrogen from the hydrogen coating unit 71. An inner space A of the hydrogen coating unit 71 communicates with the hydrogen supply unit 25 (see FIG. 11). Hydrogen is supplied to the hydrogen supply unit 25 by introducing the hydrogen from the hydrogen introduction unit 72 to the hydrogen coating unit 71. That is, in the fuel cell device 2 in FIG. 12, one hydrogen gas system is formed by the hydrogen introduction unit 72, the inner space A of the hydrogen coating unit 71, and the hydrogen discharge unit 75. The hydrogen gas system supplies hydrogen to the hydrogen coating unit 71 and supplies hydrogen to the hydrogen supply unit 25.

Figure 13:
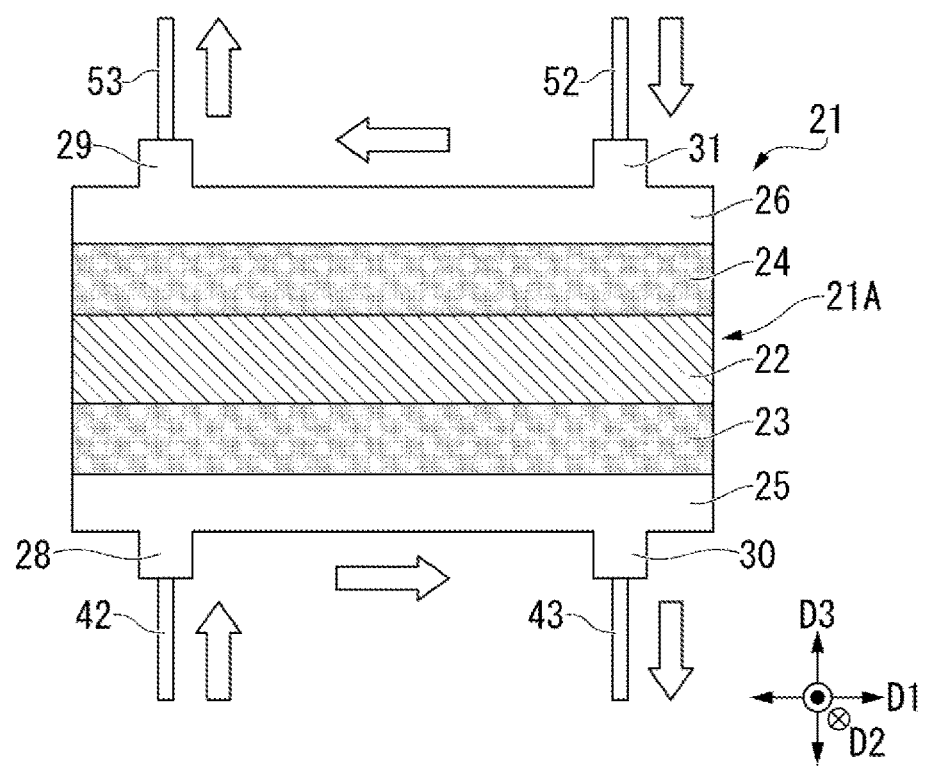
FIG. 13 is a partially enlarged view illustrating a layout of a fuel cell stack in FIG. 12.

In the modified example, as illustrated in FIG. 13, the fuel electrode 23, the electrolyte membrane 22, and the oxidant electrode 24 are laminated in this order in the vertical direction (for example, a direction D3 in the drawing). In this case, the fuel electrode 23 is preferably disposed below the electrolyte membrane 22. In this way, the fuel cell stack 21 is horizontally (transversely) disposed. Thus, under a gravitational environment, both the hydrogen flowing in the hydrogen supply unit 25 and the gas flowing in the oxygen supply unit 26 can flow in a direction perpendicular to the vertical direction. Thus, a good gas flow in which the influence of gravity is small can be implemented.

Figure 14:
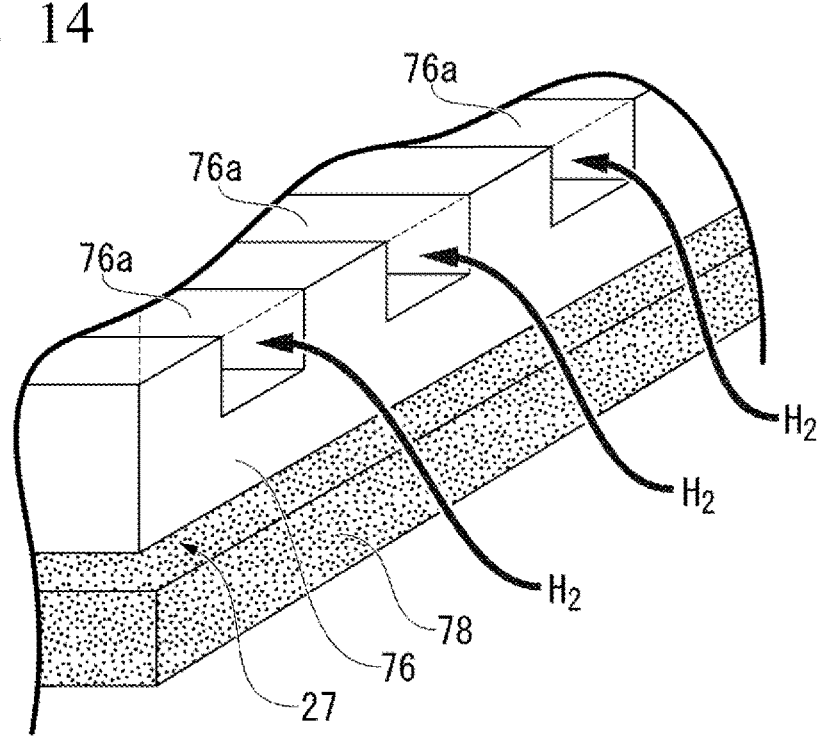
FIG. 14 is a diagram illustrating an example of a hydrogen supply side portion of a separator in FIG. 12.

In the separator 27 (see FIGS. 2A and 2B), a hydrogen supply side portion 76 has a plurality of grooves 76a formed throughout in a longitudinal direction (a direction D1 in FIG. 12) of the fuel cell stack 21, for example, as illustrated in FIG. 14. The upper portions of the plurality of grooves 76a are blocked by lamination of the fuel cell. Thus, a plurality of flow passage patterns communicating with the inner space A of the hydrogen coating unit 71 are formed.

Here, in an environment in which electron ray density is high like a lunar surface, there is concern of deterioration or the like in the electrolyte membrane due to radioactive rays transmitting through the fuel cell stack 21. Hence, in the fuel cell device 2, neurons are shielded by the hydrogen with which the hydrogen coating unit 71 is filled. In the configuration in which the hydrogen coating unit 71 is filled with hydrogen, as illustrated in FIG. 13, even in a structure in which the hydrogen supply side portion 76 of the separator 27 has a simple flow passage pattern such as a groove shape, hydrogen serving as a base of the foregoing reference voltage can be continuously supplied to the separator 27 while using the separator 27 that has the configuration. By using one hydrogen gas system, it is possible to supply hydrogen to the hydrogen supply unit 25 while filling the hydrogen coating unit 71 with hydrogen. Thus, the fuel cell device can be simplified.

The fuel cell device 2 may include a neutron shielding member 77 provided between the hydrogen coating unit 71 and the fuel cell stack 21 (see FIG. 12). A position at which the neutron shielding member 77 is disposed is not particularly limited.

For example, the neutron shielding member 77 is disposed on an inner surface of the hydrogen coating unit 71 and is preferably disposed to cover the fuel cell stack 21. The shape of the neutron shielding member 77 is not particularly limited and any of various shapes such as a sheet shape can be used. The neutron shielding member 77 is formed of, for example, beryllium, an alloy with beryllium, or a material containing a heavy metal. For example, lead or an alloy with lead is an exemplary example of the heavy metal.

The fuel cell device 2 may include a moisture absorption member 78 mounted on the fuel cell stack 21. In this case, an upstream end portion 73b of the capillary port 73 comes into contact with the moisture absorption member 78 or is disposed near the moisture absorption member 78. The moisture absorption member 78 is formed as, for example, a mesh member or a porous member. For example, a wick is an exemplary example of the mesh member. Thus, since water generated inside the hydrogen coating unit 71 is discharged to the outer space via the moisture absorption member 78, the discharge amount of hydrogen at the time of discharge of water from the capillary port 73 can be reduced.

The moisture absorption member 78 may be disposed on the lower surface of the fuel cell stack 21. Under a gravitational environment, the moisture absorption member 78 can be spread all over below the fuel cell stack 21, and thus can function as a buffer at the time of discharge of water necessary in an emergency.

A portion including the position at which the moisture absorption member 78 is disposed may be cooled so that a temperature is relatively lower than in the other portions of the hydrogen coating unit 71. Thus, water is easily generated in the moisture absorption member 78, and thus it is possible to further reduce the discharge amount of hydrogen when water is discharged from the capillary port 73.

In the fuel cell system 1 according to the embodiment, the dehumidifier 62 is connected to the oxygen discharge passage 53 of the oxygen supply unit 26 and is able to be switched from one water recovery tank 63 to another water recovery tank 63 (see FIG. 11). The control unit 3 switches the water recovery tank 63 based on a product $(t) \times (I)$ of a current value (I) and a conduction time (t) to the load 4 connected to the fuel cell stack 21.

Under a closed environment and an oxygen supply environment, much water is generated in a short time although efficient recovery of water is required. With detection of an amount of water in the water recovery tank 63, water may overflow inside the fuel cell system 1 when breakdown or the like of a sensor for determining the amount of water occurs, and there is a possibility of a problem such as power generation stop and further flooding occurring. In the embodiment, by using the dehumidifier 62 equipped to be able to be switched between the plurality of water recovery tanks 63, the control unit 3 measures the conduction time (t) to the load 4 and the current measurement unit 7 measures the current value (I) to calculate the product (t)×(I). When the calculated value of the product (t)×(I) is equal to or greater than a predetermined threshold set based on correlation between the product (t)×(I) and the theoretical generation amount of water, it is determined that the water recovery tank 63 which is being used is full of water up to a capacity and one water recovery tank 63 which is being used is switched to another unused water recovery tank 63. Thus, it is possible to reliably prevent leakage of water inside the fuel cell system 1 and further prevent occurrence of a problem such as flooding.

The fuel cell system 1 may include a temperature measurement unit 81 that measures a temperature of the fuel cell stack 21 (or the fuel cell 21A) and a temperature adjustment unit 82 that performs temperature regulation of the fuel cell stack 21. In this case, the control unit 3 transmits a control signal to the temperature adjustment unit 82 based on a measured value of a temperature of the fuel cell stack 21. The temperature adjustment unit 82 cools or heats the fuel cell stack 21 based on the control signal transmitted from the control unit 3. Thus, it is possible to maintain the fuel cell stack 21 at an appropriate temperature during power generation.

The temperature measurement unit 81 may include, for example, a hydrogen-side temperature sensor mounted on a hydrogen line of the fuel cell stack 21 and a gas-side temperature sensor mounted on a gas (oxygen) line.

The temperature regulation of the fuel cell stack 21 is not particularly limited and is, for example, of a water-cooling type. In the temperature regulation of the water-cooling type, water generated through power generation of the fuel cell device 2 can be used.

The control unit 3 or the temperature adjustment unit 82 may perform the temperature regulation of the fuel cell stack 21 based on a measured value of the voltage V of the fuel cell stack 21 transmitted from the voltage measurement unit 6. The control unit 3 or the temperature adjustment unit 82 may record the measured value of the voltage V of the fuel cell stack 21 to be readable on a recording medium such as a data logger.

The fuel cell system 1 may include a battery 8 electrically connected to the fuel cell stack 21 in parallel (see FIG. 11). The battery 8 is connected to a power system inside a mobile object and can supply power to another power system, for example, when sufficient power generation is difficult in the fuel cell device 2, such as the time of abnormality detection or the time of activation. When the battery 8 is used only at the time of activation, the battery 8 can be set to have a minimum necessary capacity. Thus, the battery 8 can be miniaturized and space reduction can be achieved.

By connecting the battery 8 to the fuel cell stack 21 in this way, it is possible to return a mobile object in an emergency using the battery 8 as an emergency power when any problem occurs in the fuel cell device 2. The battery 8 may be connected to a solar photovoltaic device or a temperature difference power generation device mounted on a rover. In this case, in lunar surface investigation, the battery 8 can be supplementarily charged with power generated with the solar photovoltaic device or the temperature difference power generation device.

According to the embodiment, the hydrogen coating unit 71 is disposed to cover the fuel cell stack 21 and is configured to be filled with hydrogen therein. The hydrogen introduction unit 72 introduces hydrogen to the hydrogen coating unit 71. Therefore, by coating the fuel cell stack 21 with hydrogen, it is possible to inhibit energy loss of neutrons due to collision with hydrogen and considerably inhibit deterioration and wearing of the electrolyte membrane 22. Thus, it is possible to prevent occurrent of deterioration or breakdown of the fuel cell stack 21. Since hydrogen used as a reductant of the fuel cell stack 21 is also used as a filler material in the inner space of the hydrogen coating unit 71, it is not necessary to provide a neutron shielding member separately. It is possible to implement simplicity, weight reduction, and space reduction of the system.

The fuel cell system 1 includes the fuel cell device 2, that is, an impedance measurement unit 5 that measures impedance Z of the fuel cell stack 21, a voltage measurement unit 6 that measures a voltage V of the fuel cell stack 21, and a current measurement unit 7 that measures a current I flowing in the load 4 (see FIGS. 1 and 11). A signal in accordance with a measurement result of the impedance measurement unit 5, a signal in accordance with a measurement result of the voltage measurement unit 6 and a signal in accordance with a measurement result of the current measurement unit 7 are each transmitted to the control unit 3.

Next, with reference to FIGS. 4-10, activation control, steady operation control, end control of the fuel cell will be described in sequence as control of the fuel cell device 2 applied to the fuel cell system 1. The activation control, the steady operation control, end the control of the fuel cell may be performed at the fuel cell system in FIG. 1 or at the fuel cell system in FIG. 11.

[Activation Control]

Figure 4:
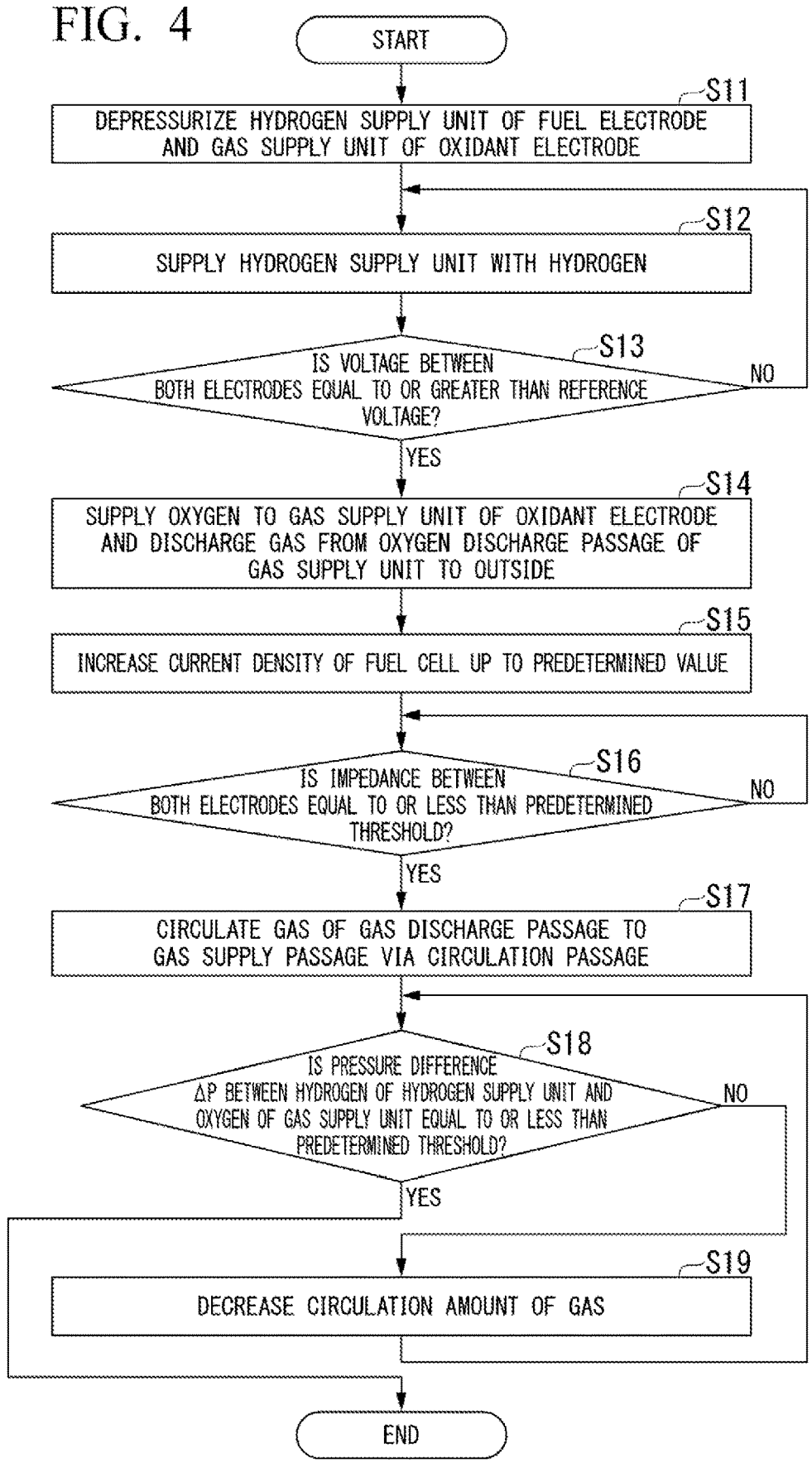
FIG. 4 is a flowchart illustrating an example of activation control of the fuel cell device performed in the fuel cell system in FIG. 1.
Figure 5:
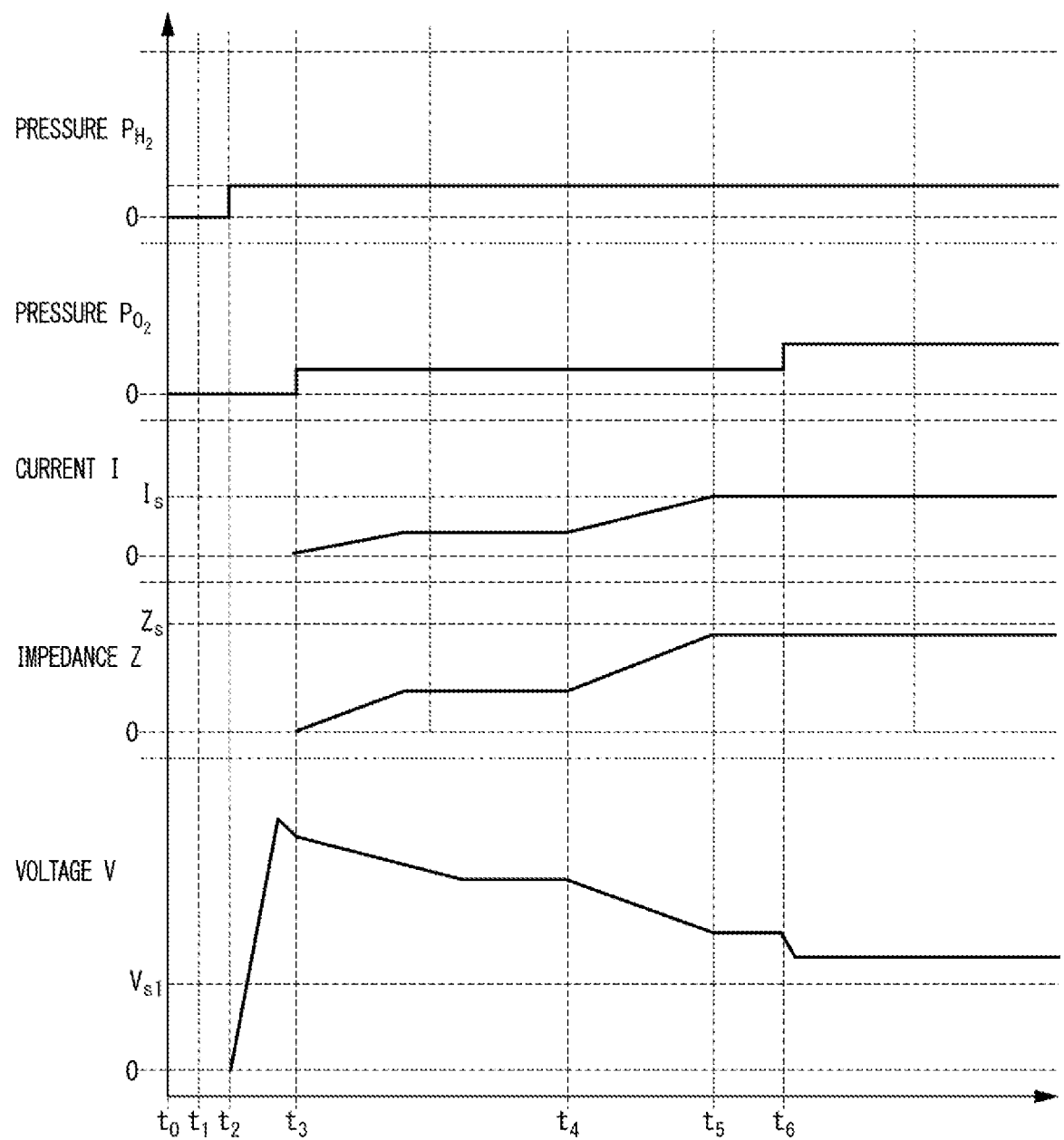
FIG. 5 is a timing chart illustrating a change in a state of each unit when the activation control of the fuel cell device in FIG. 4 is performed.

FIG. 4 is a flowchart illustrating an example of activation control of the fuel cell device 2 performed in the fuel cell system 1 in FIG. 1. FIG. 5 is a timing chart illustrating a change in a state of each unit when the activation control of the fuel cell device 2 in FIG. 4 is performed. Each step of the activation control can be performed by the control unit 3.

In the embodiment, as a preservation state (time t0), there is a depressurized and sealed state in which neither hydrogen nor oxygen is supplied. Accordingly, a state in which the voltage V is 0 V is a preferable state.

First, when power generation of the fuel cell device 2 starts, the hydrogen supply unit 25 of the fuel electrode 23 and the oxygen supply unit 26 of the oxidant electrode 24 are depressurized (step S11: time t1 of FIG. 5). For example, in the outer space, the hydrogen supply unit 25 and the oxygen supply unit 26 can be depressurized by purging the hydrogen discharge passage 43 and the oxygen discharge passage 53. Under the atmospheric pressure, the hydrogen supply unit 25 and the oxygen supply unit 26 can be depressurized by providing pumps or the like (not illustrated) in the hydrogen discharge passage 43 and the oxygen discharge passage 53. Thus, the hydrogen remaining in the hydrogen supply unit 25 is discharged and the oxygen remaining in the oxygen supply unit 26 is discharged. As will be described below, when the fuel cell device 2 is stored and each of the hydrogen supply unit 25 and the oxygen supply unit 26 is charged with a gas such as an inert gas, the gas is discharged.

Subsequently, hydrogen is supplied to the hydrogen supply unit 25 (step S12: time t2 of FIG. 5). The hydrogen from the hydrogen supply source 41 is supplied to the hydrogen supply unit 25 via the hydrogen introduction passage 42. To facilitate description in FIG. 5, pressure PH2 of the hydrogen enters the ON state at time t2, but the supply amount may be gradually increased.

Thereafter, a voltage between the fuel electrode 23 and the oxidant electrode 24 is measured and it is determined whether the voltage is equal to or greater than a reference voltage Vs1 (step S13). The value of the reference voltage Vs1 (an electromotive force) is not particularly limited and is, for example, 100 mV. In this step, it can be checked whether hydrogen is normally supplied to the hydrogen supply unit 25 by using a difference in the potential between both the electrodes generated to correspond to hydrogen density, that is, an electromotive force of a concentration cell.

When the voltage between the fuel electrode 23 and the oxidant electrode 24 is equal to or greater than the reference voltage Vs1 (YES in step S13), it is determined that the hydrogen is normally supplied to the hydrogen supply unit 25 and the gas is discharged from the oxygen supply unit 26 to the outside while supplying a gas to the oxygen supply unit 26 (step S14: time t3 of FIG. 5). At this time, the circulation pump 58 may be operated to circulate the gas via the circulation passage 57. When the gas is oxygen, the supply amount of oxygen is not particularly limited and is, for example, 0.5 to 10 times the supply amount of hydrogen. When oxygen is supplied as an oxidant, flooding easily occurs. Therefore, a supply amount of oxygen is increased more than in a case in which air is used as the oxidant. In this step, desorption of the moisture from the electrolyte membrane 22 is accelerated by the flow of the oxygen in the oxygen supply unit 26, unnecessary moisture is discharged to the outside along with the oxygen, and thus the occurrence of the flooding can be presented.

When the voltage between the fuel electrode 23 and the oxidant electrode 24 is less than the reference voltage Vs1 (NO in step 13), the process returns to step S12 to continue the supply of the hydrogen to the hydrogen supply unit 25. When the voltage is less than the reference voltage Vs1 despite the continuous supply of the hydrogen to the hydrogen supply unit 25 for a predetermined time or more which has been pre-decided, it is determined that a failure occurs in the fuel cell system 1. Then, the activation control is stopped.

When oxygen is supplied as an oxidant, leakage of the hydrogen occurs due to some reason, and the oxygen is supplied to the oxygen supply unit 26, the hydrogen with reacts with the oxygen radically. Thus, due to the reaction, there is concern of the fuel cell stack 21 being broken down. Further, when a gas is supplied to the oxygen supply unit 26 before the supply of the hydrogen to the hydrogen supply unit 25, carbon of a catalytic layer of an electrode adjacent to, particularly, the electrolyte membrane 22 is oxidized. Thus, the oxidation of the carbon causes occurrence of breakdown or deterioration of the fuel cell stack 21. By supplying the hydrogen to the hydrogen supply unit 25 and supplying the gas to the oxygen supply unit 26 as in this step, it is possible to prevent occurrence of radical reaction of the hydrogen and the oxygen and prevent deterioration or breakdown of the fuel cell stack 21.

Subsequently, current density (or the current I) of the fuel cell device 2 is increased up to a predetermined value Is while performing conduction using external resistance (step S15: times t4 to t5 of FIG. 5). The predetermined value Is of the current density is not particularly limited and is, for example, 0 to 0.1 A/cm$^2$. As described above, for example, the load 4 such as a heater or a motor used in a closed environment is connected to the fuel cell device 2. By decreasing the load 4 (resistance), it is possible to increase the current density of the fuel cell device 2.

Thereafter, it is determined whether impedance Z between the fuel electrode 23 and the oxidant electrode 24 is equal to or less than a predetermined threshold Zs (step S16: time t5 of FIG. 5). The predetermined threshold of the impedance Z is not particularly limited and is, for example, 5 mΩ to 20 mΩ at 1 kHz. When the moisture in the electrolyte membrane 22 is insufficient, the impedance Z is increased. Thus, when the impedance Z is equal to or less than the predetermined threshold, it can be determined that the amount of moisture in the electrolyte membrane 22 is appropriate, and thus it is possible to inhibit occurrence of dry-out. In particular, when air is used as an oxidant, dry-out easily occurs. Therefore, in this step, it can be checked with high accuracy whether dry-out occurs.

When the impedance Z between the fuel electrode 23 and the oxidant electrode 24 is equal to or less than the predetermined value Zs (YES in step S16), the valve 47 is closed to block a flow passage to the hydrogen discharge passage 43. Thereafter, the oxygen introduction passage 52 and the oxygen discharge passage 53 of the oxygen supply unit 26 are connected via the circulation passage 57 to form the circulation line. Then, the gas of the oxygen discharge passage 53 returns to the oxygen introduction passage 52 (step S17: time t6 of FIG. 5). In this way, the differential pressure between the fuel electrode 23 and the oxidant electrode 24 is appropriately maintained.

When the impedance Z between the fuel electrode 23 and the oxidant electrode 24 exceeds the predetermined value Zs (NO in step S16), it is determined that dry-out occurs and a circulation amount of oxygen is decreased. When the voltage is less than a predetermined value lower than the reference voltage Vs1 despite the impedance Z which is equal to or less than the threshold Zs, it can be determined that flooding occurs and the circulation amount of oxygen can be increased.

When the circulation pump 58 and the dehumidifier 62 are provided on the circulation line, the gas may be circulated in the foregoing step S17 while dehumidifying the gas using the dehumidifier 62 provided on the circulation line. Thus, it is possible to remove unnecessary moisture from the gas flowing in the circulation line and it is possible to further inhibit the occurrence of the flooding. In particular, when oxygen is used as an oxidant, flooding easily occurs. Therefore, in this step, it is possible to reliably inhibit occurrence of flooding.

When the circulation pump 58 is provided in the circulation passage 57 on the circulation line (see FIG. 1) and the impedance Z is equal to or less than the predetermined threshold Zs in the foregoing step S17, the circulation pump 58 can be activated in a state in which the gas is circulated from the oxygen supply source 51 of the gas to the outside via the oxygen introduction passage 52, the oxygen supply unit 26, and the oxygen discharge passage 53. In this case, the gas of the oxygen discharge passage 53 returns to the oxygen introduction passage 52 by closing a discharge system discharging the gas from the oxygen discharge passage 53 to the outside. The closing of the discharge system can be performed using, for example, the three-way valve 56. Thus, the whole gas flowing in the oxygen discharge passage 53 is sent to the oxygen introduction passage 52 via the circulation passage 57, and thus is in a state in which the gas is not discharged to the outside.

Subsequently, a pressure difference ΔP between the hydrogen supply unit 25 and the gas of the oxygen supply unit 26 is measured and it is determined whether the pressure difference ΔP is equal to or less than a predetermined threshold (step S18). The predetermined threshold is not particularly limited and is, for example, greater than 0 and is 50 kPa (0<ΔP<50 kPa). When the pressure difference ΔP is greater than the predetermined threshold (YES in step S18), the circulation amount of gas is decreased (step S19). By setting the pressure difference to be equal to or less than the predetermined threshold, it is possible to prevent breaking of the electrolyte membrane 22 due to a gas pressure. It is preferable to set a pressure PGAS of the gas to be higher than a pressure PH2 of the hydrogen (ΔP=PGAS−PH2). Thus, it is possible to implement safer operation. When the pressure difference ΔP is equal to or less than the predetermined threshold (NO in step S18), the activation control ends and the process proceeds to steady operation control to be described below.

As described above, according to the activation control, the hydrogen is supplied to the hydrogen supply unit 25 (step S12). When the voltage V between the fuel electrode 23 and the oxidant electrode 24 is equal to or greater than the reference voltage Vs1 (YES in step S13), the gas is discharged from the oxygen supply unit 26 to the outside while supplying the gas to the oxygen supply unit 26 (step S14). Therefore, it can be determined accurately whether the hydrogen is normally supplied to the hydrogen supply unit 25 by using the reference voltage and the gas is supplied to the oxygen supply unit 26 based on a determination result. Therefore, it is possible to prevent occurrence of deterioration or breakdown of the fuel cell stack 21. Accordingly, it is possible to prevent occurrence of a problem in the fuel cell device 2 during the activation and it is possible to improve safety and reliability.

[Steady Operation Control]

Figure 6:
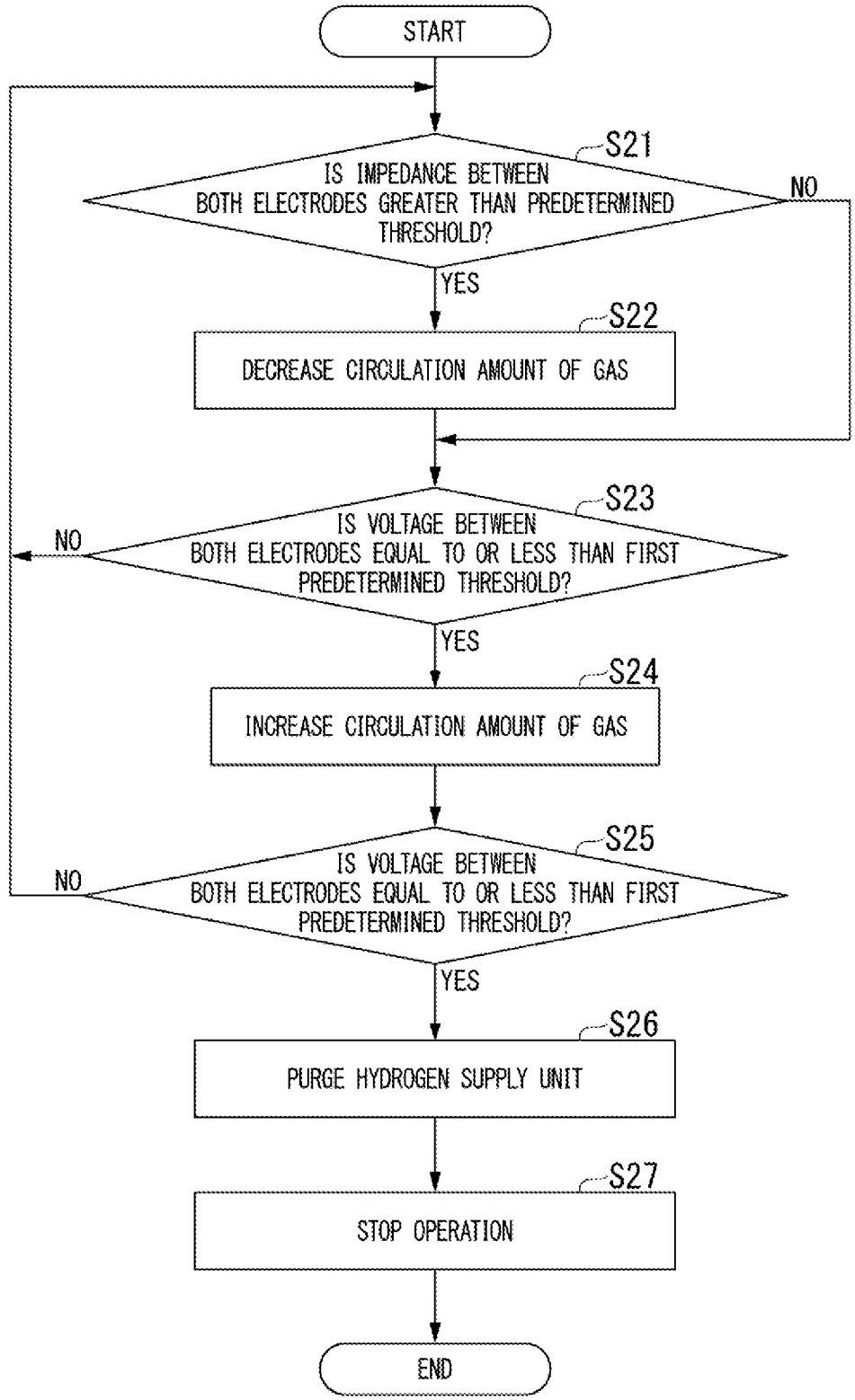
FIG. 6 is a flowchart illustrating an example of steady operation control of the fuel cell device performed in the fuel cell system in FIG. 1.
Figure 7:
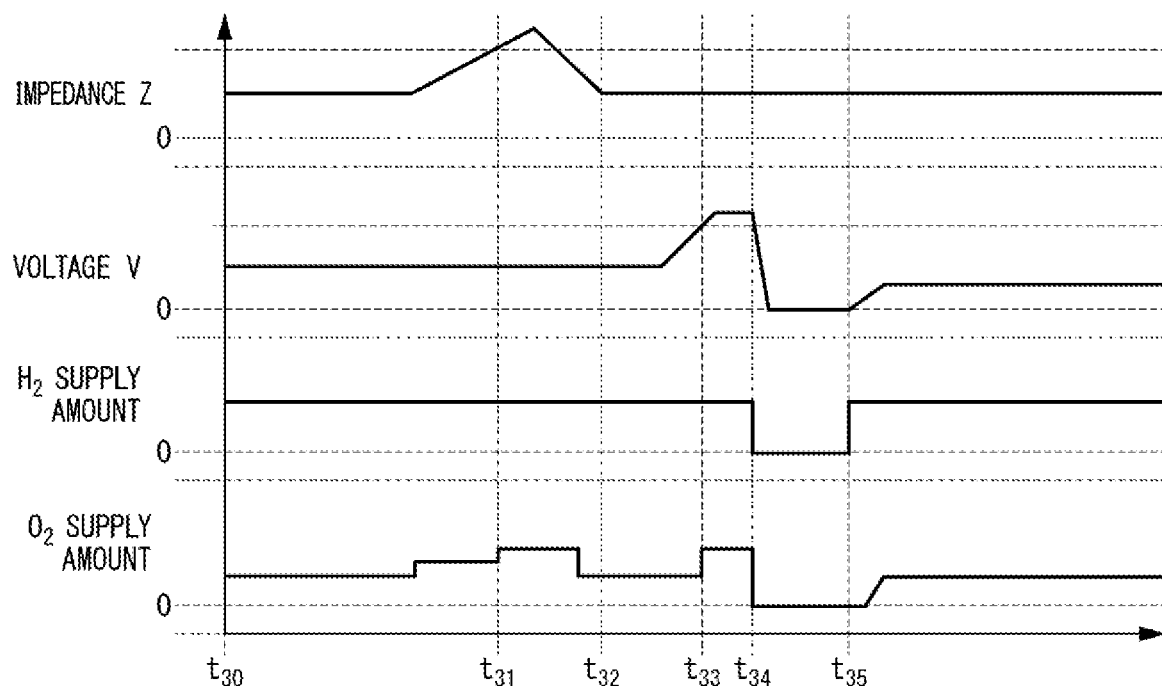
FIG. 7 is a timing chart illustrating a change in a state of each unit when the steady operation control of the fuel cell device in FIG. 6 is performed.

FIG. 6 is a flowchart illustrating an example of steady operation control of the fuel cell device 2 performed in the fuel cell system 1 in FIG. 1. FIG. 7 is a timing chart illustrating a change in a state of each unit when the steady operation control of the fuel cell device 2 in FIG. 6 is performed. Each step of the steady operation control can be performed by the control unit 3 similarly to the foregoing activation control.

First, during a steady operation of the fuel cell device 2, it is determined whether the impedance Z between the fuel electrode 23 and the oxidant electrode 24 is greater than the predetermined threshold (step S21). The predetermined threshold of the impedance Z may be measured as, for example, 1 kHz (a fixed value), as described above, and may be set based on about three points of the impedance appropriate between 10 mHz to 1 kHz. When the predetermined threshold is set based on about three points of the impedance, impedance data (a Nyquist diagram) can be acquired, three points of frequency indicating typical impedance can be determined, and the predetermined threshold can be determined using the impedance at that time, for example, in a state in which the fuel cell device 2 is sound.

When the impedance Z is greater than the predetermined threshold (YES in step S21: time t31 of FIG. 7), dry-out in the electrolyte membrane 22 is determined and a flow rate of the gas circulating via the circulation passage 57 connecting the oxygen introduction passage 52 to the oxygen discharge passage 53 is decreased (step S22: time t31 to t32 of FIG. 7). Thus, the discharge of the moisture in the electrolyte membrane 22 can be inhibited by the flow of the gas of the oxygen supply unit 26 and the electrolyte membrane 22 can enter an appropriate humidified state.

In step S22, the occurrence of dry-out is determined based on the impedance Z, but the present invention is not limited thereto. The occurrence of the dry-out may be determined based on one or a plurality of current interruption, a load change, and DC resistance. The occurrence of the dry-out may be determined based on the impedance Z and one or a plurality of, current interruption, a load change, and DC resistance. Thus, it is possible to determine the occurrence of the dry-out more accurately.

In the embodiment, when the impedance Z is greater than the predetermined threshold, the flow rate of the gas circulating via the circulation passage 57 is decreased, but the present invention is not limited thereto. A flow rate of the gas circulating via the circulation passage 57 may be decreased and a flow rate of the gas may be decreased. Thus, the electrolyte membrane 22 can enter an appropriate humidified state in a shorter amount of time.

Conversely, when the impedance Z is equal to or less than the predetermined threshold (NO in step S21), the voltage V between the fuel electrode 23 and the oxidant electrode 24 is measured and it is determined whether the voltage V is equal to or less than the first predetermined threshold (step S23). The first predetermined threshold of the voltage V is not particularly limited and is, for example, a value in the range of 500 mV to 600 mV.

When the voltage V is equal to or less than the first predetermined threshold (YES in step S23): time t33 to t34 of FIG. 7), flooding is determined and a flow rate of the gas circulating via the circulation passage 57 is increased (step S24: time t33 to t34 of FIG. 7). For example, when the impedance Z is equal to or less than the predetermined threshold and the voltage V is equal to or less than the first predetermined threshold, an ejection amount of the circulation pump 58 is increased and the circulation amount of gas is increased. Thus, the discharge of the moisture in the electrolyte membrane 22 by the flow of the gas of the oxygen supply unit 26 can be accelerated and the electrolyte membrane 22 can enter an appropriate humidified state. When the voltage V exceeds the first predetermined threshold in the control of step S24, the flow rate of the gas circulating via the circulation passage 57 is returned to the steady state (time t35 of FIG. 7).

When the voltage V is equal to or less than the first predetermined threshold in step S24, a flow rate of the gas circulating via the circulation passage 57 is increased, but the present invention is not limited thereto. The flow rate of the gas circulating via the circulation passage 57 may be increased and the flow rate of the gas may be increased. Thus, the electrolyte membrane 22 can enter an appropriate humidified state in a shorter amount of time.

Subsequently, it is determined again whether the voltage V between the fuel electrode 23 and the oxidant electrode 24 is equal to or less than the first predetermined threshold (step S25). When the voltage V is equal to or less than the first predetermined threshold in the redetermination (YES in step S25), the hydrogen supply unit 25 is purged (step S26: time t34 of FIG. 7) and a subsequent operation is stopped (step S27). In general, the electrolyte membrane 22 can enter an appropriate humidified state by performing the foregoing adjustment of the flow rate of the gas. However, the voltage V is not recovered to a normal value due to some reason in some cases. In these cases, by purging the hydrogen supply unit 25 in step S27, the moisture in the electrolyte membrane 22 can be discharged through the purging and the voltage V can be recovered to a normal value equal to or greater than the first predetermined threshold.

When the voltage V is greater than the first predetermined threshold in step S23 (NO in step S23) or the voltage V is greater than the first predetermined threshold in the redetermination of step S25 (NO in step S25), the process returns to step S21. The process proceeds to end control to be described below, as necessary.

A method of purging the hydrogen supply unit 25 is not particularly limited. For example, in the outer space, a capillary (not illustrated) is provided in the hydrogen discharge passage 43 and hydrogen is released to the outer space via the capillary. Since the fuel cell device 2 is normally disposed in pressurized cabin where people act, the hydrogen of the hydrogen discharge passage 43 is gradually depressurized and sudden discharge of the hydrogen is prevented. Thus, it is possible to purge the hydrogen supply unit 25 safely in a simple configuration.

When the voltage V is equal to or less than the first predetermined threshold, the hydrogen supply unit 25 is purged in step S27, but the present invention is not limited thereto. When the voltage V is equal to or less than the first predetermined threshold, the hydrogen supply unit 25 may be purged and the hydrogen supply unit 25 may be purged periodically at a separate predetermined timing. The predetermined timing of the purging is not particularly limited and is, for example, an interval of 15 minutes.

Further, a warm retaining member (not illustrated) may be provided in the hydrogen introduction passage 42 or the hydrogen discharge passage 43. Thus, condensation or freezing which can occur due to the purging of the hydrogen supply unit 25 can be prevented and safer and more reliable purging can be performed.

As described above, according to the steady operation control, when the impedance Z between the fuel electrode 23 and the oxidant electrode 24 is greater than the predetermined threshold (YES in step S21), the flow rate of the gas circulating via the circulation passage 57 is decreased (step S22). Conversely, when the impedance Z is equal to or less than the predetermined threshold (NO in step S21), it is determined whether the voltage V between the fuel electrode 23 and the oxidant electrode 24 is equal to or less than the first predetermined threshold (step S23). When the voltage V is equal to or less than the first predetermined threshold, the flow rate of the gas circulating in the circulation passage 57 is increased. That is, by using both the impedance Z and the voltage V, it can be accurately determined whether any of dry-out and flooding occurs during power generation of the fuel cell device 2 and the electrolyte membrane 22 can enter an appropriate humidified state based on the determination result. Accordingly, it is possible to prevent both occurrence of flooding and occurrence of dry-out and it is possible to implement power generation in which good water balance is maintained.

(Emergency Stop Control)

Figure 8:
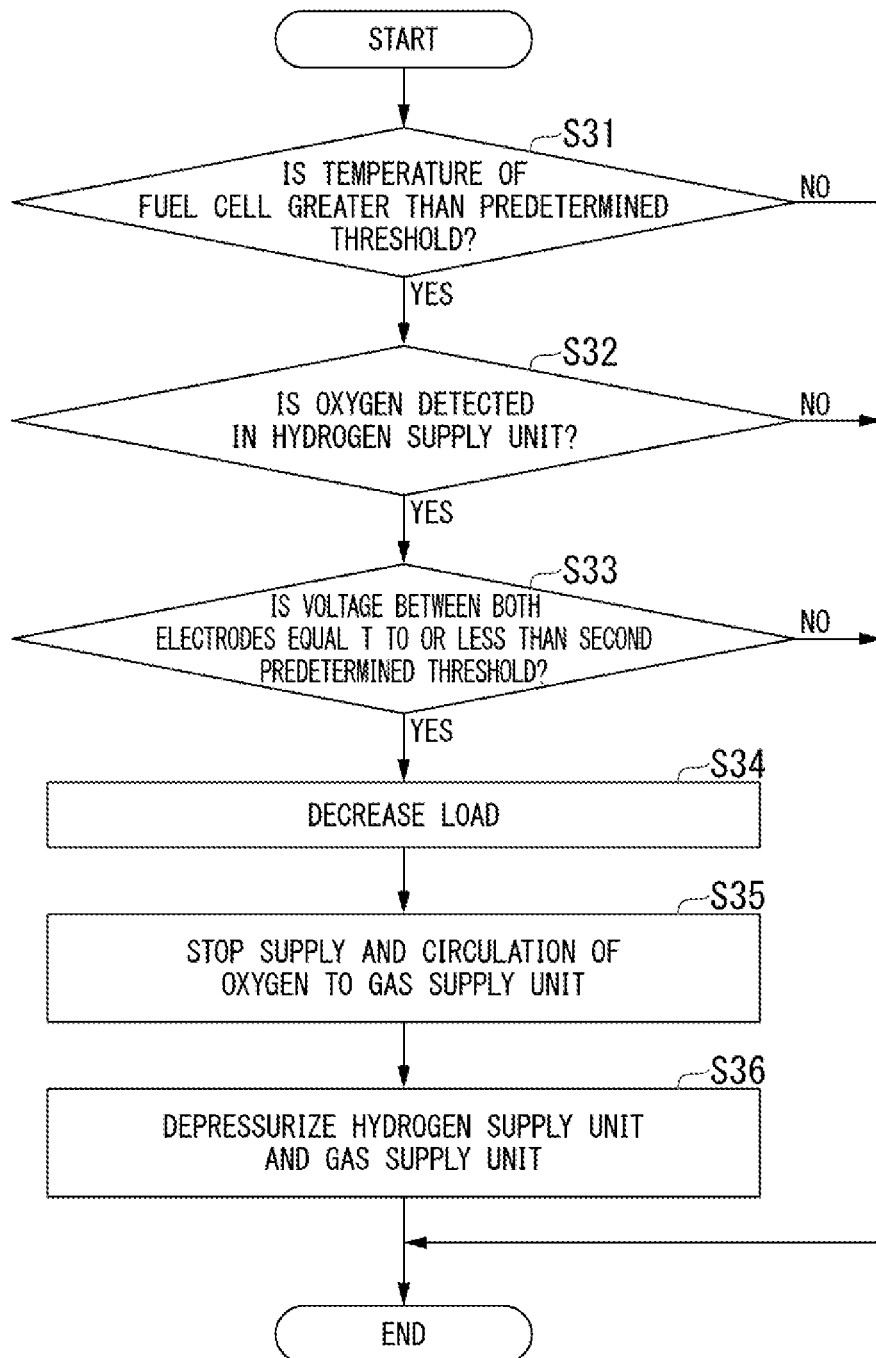
FIG. 8 is a flowchart illustrating an example of emergency stop control of the fuel cell device during the steady operation.

FIG. 8 is a flowchart illustrating an example of emergency stop control of the fuel cell device 2 during the steady operation. The emergency stop control is performed independently or in parallel with the foregoing steady operation control. Each step of an emergency stop method can be performed by the control unit 3 similarly to the steady operation control.

The emergency stop control is performed when a temperature Tf of the fuel cell stack 21 of the fuel cell device 2 is greater than a predetermined threshold (YES in step S31), oxygen is detected in the hydrogen supply unit 25 (YES in step S32), or the voltage V between the fuel electrode 23 and the oxidant electrode 24 is less than a second predetermined threshold (YES in step S33) and therefore an occurrence of abnormality of the fuel cell device 2 is determined.

The predetermined threshold of the temperature Tf is not particularly limited and is, for example, 90 to 100° C. Thus, temperature abnormality of the fuel cell device 2 can be detected and the fuel cell device 2 can be stopped safely. Oxygen in the hydrogen supply unit 25 can be detected by, for example, providing, an oxygen sensor (not illustrated) in the hydrogen supply unit 25. Thus, leakage of the oxygen in the fuel cell device 2 can be detected and the fuel cell device 2 can be stopped safely. The second predetermined threshold of the voltage V is not particularly limited and is a value less than the first predetermined threshold of the voltage V. For example, when power is generated with hydrogen/oxygen, the second predetermined threshold is 400 mV to 500 mV per cell. Thus, when much water is generated by the fuel cell device 2, the fuel cell device 2 can be stopped safely.

Determining occurrences of abnormalities may be determined in succession in FIG. 7 or may be performed in parallel at an appropriate timing When the temperature Tf of the fuel cell stack 21 is greater than the predetermined threshold, oxygen is detected in the hydrogen supply unit 25, or the voltage V is less than the second predetermined threshold, the load 4 connected to the fuel cell stack 21 is first decreased (step S34). For example, the load 4 (resistance) is decreased based on an abnormality signal transmitted from the control unit 3.

Subsequently, the supply of the gas to the oxygen supply unit 26 is stopped and the circulation of the gas circulating in the circulation passage 57 connecting the oxygen introduction passage 52 to the oxygen discharge passage 53 is stopped (step S35). For example, the valve 54 provided upstream from the oxygen introduction passage 52 is closed to stop the supply of the gas to the oxygen supply unit 26. In the three-way valve 56 provided in the oxygen discharge passage 53, the supply of the gas from the oxygen discharge passage 53 to the circulation passage 57 is stopped and the gas is discharged from the oxygen discharge passage 53 to the outside. Besides, the circulation pump 58 of the circulation passage 57 may be stopped.

Further, the hydrogen supply unit 25 and the oxygen supply unit 26 are depressurized (step S36). A method of depressurizing the hydrogen supply unit 25 is not particularly limited. In the outer space, for example, the hydrogen discharge passage 43 is opened to the outer space to discharge the hydrogen to the outer space, similarly to the purging method. A method of depressurizing the oxygen supply unit 26 can also be performed by opening the oxygen discharge passage 53 to the outer space and discharging the gas to the outer space, similarly to the method of depressurizing the hydrogen supply unit 25. Thus, the hydrogen can be caused to not remain in the hydrogen supply unit 25 and the gas can also be caused to not remain in the oxygen supply unit 26.

According to the emergency stop method, the fuel cell device 2 can be stopped safely when an environment in which an emergency is required during a steady operation of the fuel cell device 2 occurs.

When at least two of the three types of abnormality described above are satisfied, the load 4 connected to the fuel cell stack 21 may be decreased, the supply of the gas to the oxygen supply unit 26 may be stopped, the circulation of the gas via the circulation passage 57 may be stopped, and the hydrogen supply unit 25 and the oxygen supply unit 26 may be further depressurized. Thus, it is possible to set conditions for the emergency stop more strictly and it is possible to prevent emergency stop caused due to erroneous detection.

[End Control]

Figure 9:
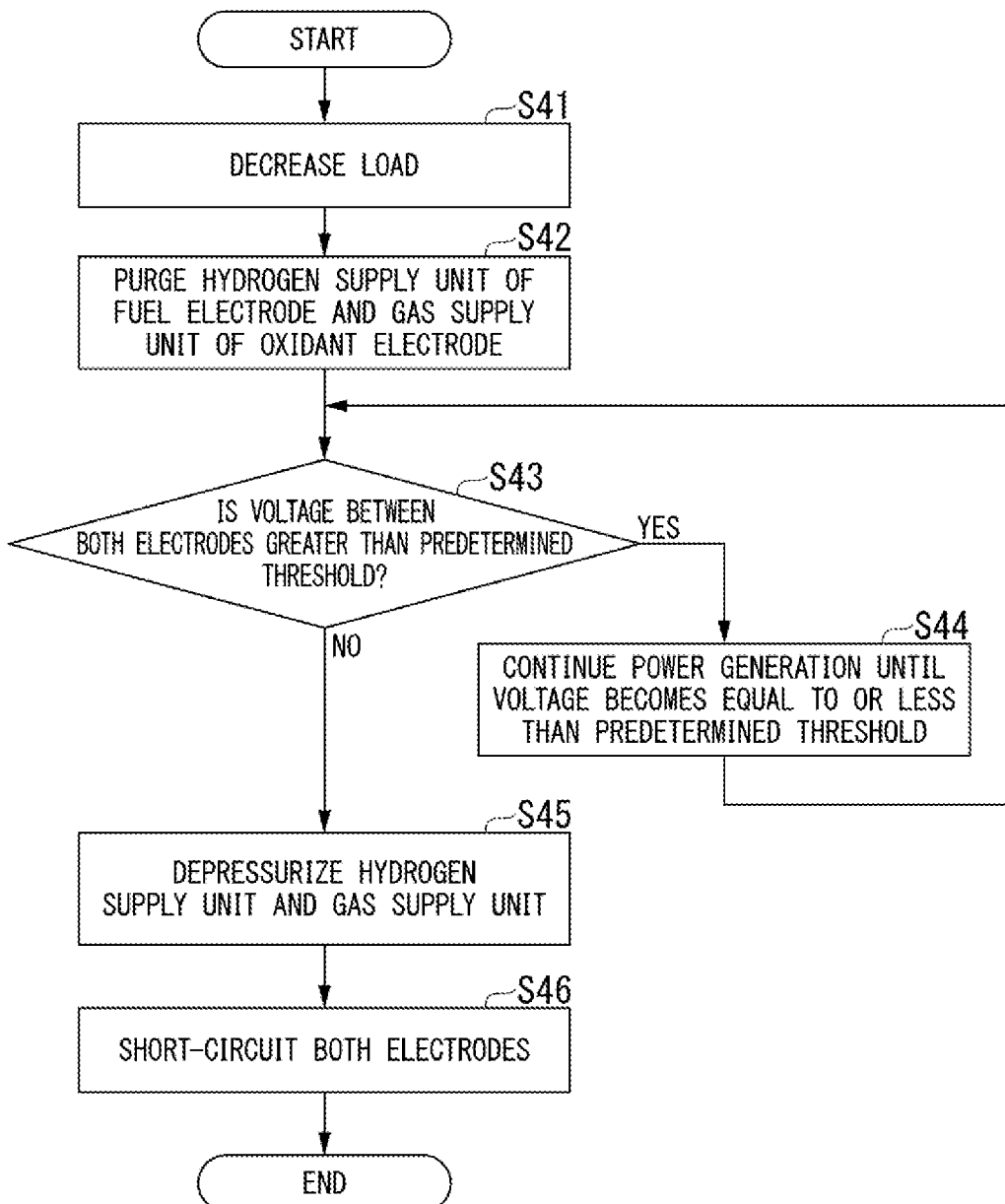
FIG. 9 is a flowchart illustrating an example of end control of the fuel cell device performed in the fuel cell system in FIG. 1.
Figure 10:
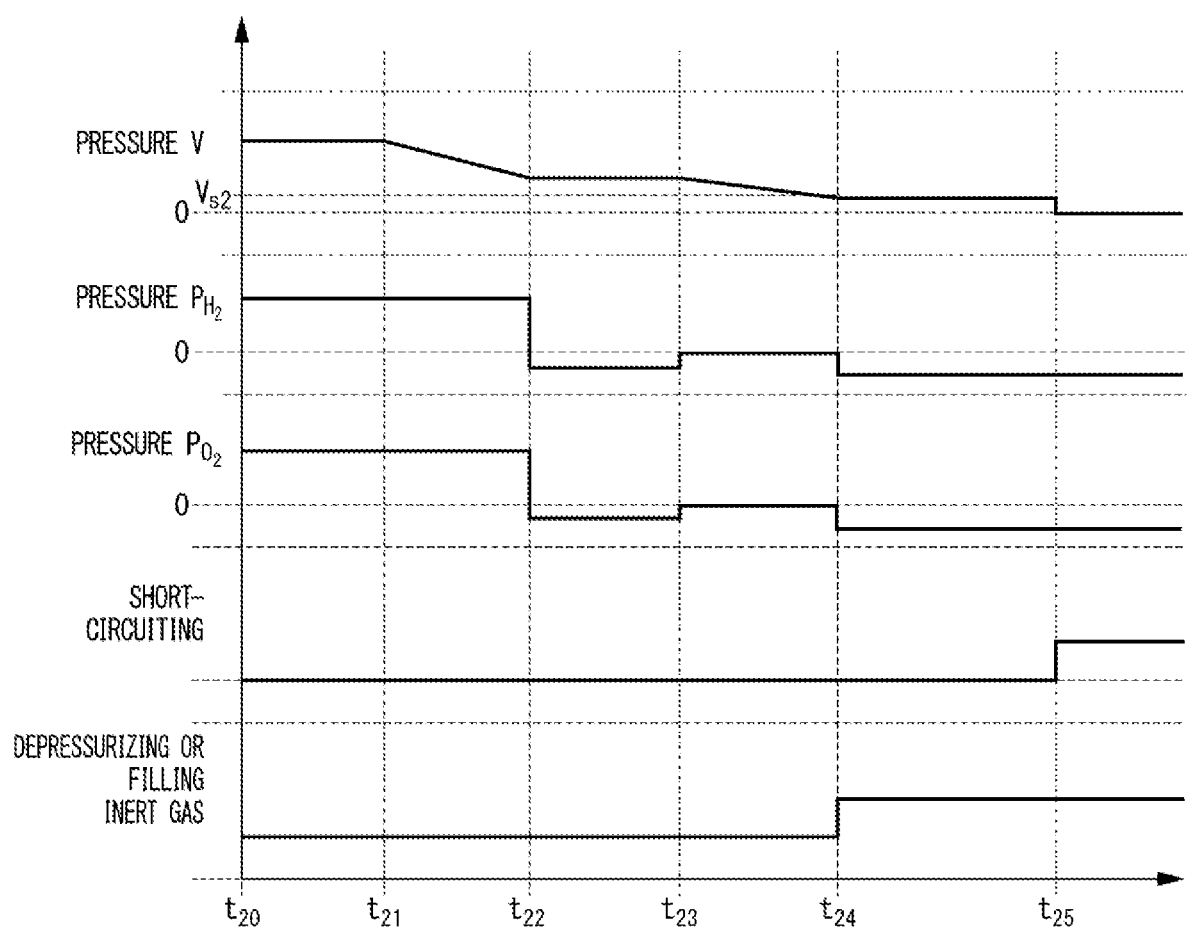
FIG. 10 is a timing chart illustrating a change in a state of each unit when activation control of the fuel cell device in FIG. 9 is performed.

FIG. 9 is a flowchart illustrating an example of end control of the fuel cell device 2 performed in the fuel cell system 1 in FIG. 1. FIG. 10 is a timing chart illustrating a change in a state of each unit when the end control of the fuel cell device 2 in FIG. 8 is performed. Each step of the end control can be performed by the control unit 3, similarly to an activation operation.

When an operation of the fuel cell device 2 in which the steady operation control is performed (time t30 to t31 of FIG. 7) ends, the load 4 is first decreased (step S41: time t21 to t22 of FIG. 10). Thereafter, the hydrogen discharge passage 43 is opened, the hydrogen supply unit 25 of the fuel electrode 23 is purged, the oxygen discharge passage 53 is opened, and the oxygen supply unit 26 of the oxidant electrode 24 is purged (step S42: time t22 of FIG. 10). A method of purging the hydrogen supply unit 25 and a method of purging the oxygen supply unit 26 can be performed, for example, similarly to the foregoing purging method. Thus, the hydrogen inside the hydrogen supply unit 25 is discharged to the outside and the gas inside the oxygen supply unit 26 is discharged to the outside.

After the purging of step S42 is cancelled (time t23 of FIG. 10), the voltage V between the fuel electrode 23 and the oxidant electrode 24 is measured and it is determined whether the voltage V is greater than a predetermined threshold Vs2 (step S43). The predetermined threshold Vs2 of the voltage V is not particularly limited as long as the predetermined threshold Vs2 is a voltage at which a catalyzer of an electrode is oxidized. For example, the predetermined threshold Vs2 is 300 mV per cell. When the voltage V is greater than the predetermined threshold Vs2 (YES in step S43), power generation in the fuel cell device 2 continues until the voltage V becomes equal to or less than the predetermined threshold Vs2 (step S44: time t23 to t24 of FIG. 10). Since both the hydrogen supply unit 25 of the fuel electrode 23 and the oxygen supply unit 26 of the oxidant electrode 24 are purged, the voltage V between the fuel electrode 23 and the oxidant electrode 24 can be decreased due to the power generation of this step.

When the voltage V is equal to or less than the predetermined threshold Vs2 (NO in step S43), the hydrogen supply unit 25 and the oxygen supply unit 26 are depressurized (step S45: time t24 of FIG. 10). A method of depressurizing the hydrogen supply unit 25 and a method of depressurizing the oxygen supply unit 26 can also be performed, similarly to the depressurizing method. Thus, the hydrogen can be caused to not remain in the hydrogen supply unit 25 and the gas can also be caused to not remain in the oxygen supply unit 26.

Thereafter, the fuel electrode 23 and the oxidant electrode 24 are short-circuited as necessary (step S46: time t25 of FIG. 10) and the process ends. Thus, a potential difference between the fuel electrode 23 and the oxidant electrode 24 can be set to 0 reliably. The short-circuiting between the fuel electrode 23 and the oxidant electrode 24 can be performed, for example, by electrically connecting a switch (not illustrated) to the fuel cell device 2 in parallel.

When the voltage V is equal to or less than the predetermined threshold Vs2 (NO in step S43), the hydrogen supply unit 25 and the oxygen supply unit 26 may be filled with hydrogen or an inert gas. When the oxygen supply unit 26 is filled with hydrogen, the hydrogen can be sent from the hydrogen introduction passage 42 via the connection flow passage 45 to the oxygen introduction passage 52. Thus, a catalyst of an electrode of the fuel cell device 2, particularly, the oxidant electrode 24, can be maintained in a further unoxidized state. Since the hydrogen supply unit 25 and the oxygen supply unit 26 are filled with hydrogen with the voltage V being sufficiently low, deterioration of the catalyst caused due to an oxidation reaction including combustion can be avoided.

The hydrogen with which the hydrogen supply unit 25 and the oxygen supply unit 26 are filled can be discharged to the outside through the depressurization performed in step S11 (see FIG. 4) of the activation control during subsequent activation.

The hydrogen supply unit 25 and the oxygen supply unit 26 may be filled with hydrogen or the like when the voltage V is equal to or less than the predetermined threshold Vs2 and before the hydrogen supply unit 25 and the oxygen supply unit 26 are depressurized. The hydrogen supply unit 25 and the oxygen supply unit 26 may be filled with hydrogen or the like when the voltage V is equal to or less than the predetermined threshold Vs2 and after the hydrogen supply unit 25 and the oxygen supply unit 26 are depressurized.

The fuel electrode 23 and the oxidant electrode 24 may be short-circuited after the hydrogen supply unit 25 and the oxygen supply unit 26 are filled with hydrogen or an inert gas. Thus, deterioration of the catalyst caused due to combustion can be avoided reliably.

As described above, according to the end control, the hydrogen supply unit 25 of the fuel electrode 23 is purged and the oxygen supply unit 26 of the oxidant electrode 24 is purged (step S42). When the voltage V between the fuel electrode 23 and the oxidant electrode 24 is greater than the predetermined threshold Vs2, the power generation in the fuel cell device 2 continues (step S44). When the voltage V is equal to or less than the predetermined threshold Vs2, the hydrogen supply unit 25 and the oxygen supply unit 26 are depressurized (step S45). Therefore, in a state in which the hydrogen rarely remains in the hydrogen supply unit 25 and the gas rarely remains in the oxygen supply unit 26, the operation of the fuel cell device 2 can be ended, the fuel cell device 2 can be stored in a safe state until subsequent activation, and the fuel cell device 2 can also be activated safely during the subsequent activation.

The embodiments of the present invention have been described in detail above, but the present invention is not limited to the foregoing embodiments. Various modifications can be made within the scope of the gist of the present invention described in the claims.

For example, a method of controlling the fuel cell system and the fuel cell device can also be applied as a method for the outer space to a vehicle such as rover used for lunar investigation. The method can be applied as a method for the ground to a mobile object such as a vehicle used under a gravitational environment, such as a fuel cell vehicle.

By combining the oxidation reaction of hydrogen performed in the fuel cell device and the decomposition reaction of water, it is possible to repeat the power generation reversibly and it is possible to construct a considerably useful regenerative fuel cell system. In particular, the foregoing system can be applied as a system for the ground to regenerative energy storage and transportation hydrogen production.

INDUSTRIAL APPLICABILITY

According to the fuel cell system described above, it is possible to implement a high neutron-shielding effect and simplicity, weight reduction, and space reduction of a system.

REFERENCE SIGNS LIST

1 Fuel cell system
2 Fuel cell device
3 Control unit
4 Load
5 Impedance measurement unit
6 Voltage measurement unit
7 Current measurement unit
8 Battery
21 Fuel cell stack
21A Fuel cell
22 Electrolyte membrane
23 Fuel electrode
24 Oxidant electrode
25 Hydrogen supply unit
26 Oxygen supply unit
27 Separator
28 Hydrogen supply port
29 Oxygen discharge port
30 Hydrogen discharge port
31 Oxygen supply port
32 Fuel electrode side portion
33 Oxidant electrode side portion
34 Hydrogen inlet
35 Hydrogen outlet
36 Oxygen inlet
37 Oxygen outlet
38A Flow passage pattern
38B Flow passage pattern
39A Flow passage pattern
38B Flow passage pattern
41 Hydrogen supply source
41A Hydrogen tank
42 Hydrogen introduction passage
43 Hydrogen discharge passage
44 Three-way valve
45 Connection flow passage
46 Hydrogen pressure measurement unit
47 Valve
51 Oxygen supply source
51B Oxygen tank
52 Oxygen introduction passage
53 Oxygen discharge passage
54 Valve
55 Gas pressure measurement unit
56 Three-way valve
57 Circulation passage
58 Circulation pump
59 Pressure adjustment unit
60 Flow rate measurement unit
61 Condenser
62 Dehumidifier
63 Water recovery tank
71 Hydrogen coating unit
72 Hydrogen introduction unit
73 Capillary port
73a Downstream tip end portion
73b Upstream end portion
74 Purge port
75 Hydrogen discharge unit
76 Hydrogen supply side portion
76a Groove
77 Neutron shielding member
78 Moisture absorption member
81 Temperature measurement unit
82 Temperature adjustment unit

The invention claimed is:

1. A fuel cell system comprising:
a fuel cell in which an electrolyte membrane is inserted between a fuel electrode and an oxidant electrode, hydrogen is supplied to a hydrogen supply unit of the fuel electrode, and a gas containing oxygen is supplied to a gas supply unit of the oxidant electrode so that power is generated;
a hydrogen coating unit disposed to cover the fuel cell and configured to be filled internally with hydrogen; and
a hydrogen introduction unit configured to introduce hydrogen into the hydrogen coating unit,
a hydrogen introduction passage which supplies hydrogen to the hydrogen supply unit, and
a hydrogen supply port provided in the hydrogen supply unit and connected to the hydrogen introduction passage, wherein
an inner space of the hydrogen coating unit communicates with the hydrogen supply unit, and
hydrogen is supplied to the hydrogen supply unit by introducing hydrogen from the hydrogen introduction unit to the hydrogen coating unit.

2. The fuel cell system according to claim 1, further comprising:
a hydrogen discharge unit configured to discharge hydrogen from the hydrogen coating unit,
wherein an inner space of the hydrogen coating unit communicates with the hydrogen supply unit, and
wherein hydrogen is supplied to the hydrogen supply unit by introducing the hydrogen from the hydrogen introduction unit and the hydrogen coating unit.

3. The fuel cell system according to claim 1, further comprising a neutron shielding member provided between the hydrogen coating unit and the fuel cell.

4. The fuel cell system according to claim 3, wherein the neutron shielding member is formed of a material containing a heavy metal.

5. The fuel cell system according to claim 1, further comprising a port configured to communicate with the fuel cell and discharge water generated in the fuel cell to the outside of the hydrogen coating unit.

6. The fuel cell system according to claim 5, wherein a downstream end portion of the port has a capillary shape.

7. The fuel cell system according to claim 5, further comprising:
a moisture absorption member mounted on the fuel cell, wherein an upstream end portion of the port comes into contact with or is disposed near the moisture absorption member.

8. The fuel cell system according to claim 1, wherein an inside of the hydrogen coating unit is maintained in a state in which pressurization is achieved by hydrogen.

9. The fuel cell system according to claim 1, further comprising:
a dehumidifier connected to a gas discharge passage of the gas supply unit and configured to be switchable from one water recovery tank to another water recovery tank,
wherein the water recovery tank is switched based on a product of a current value and a conduction time to a load connected to the fuel cell.

10. The fuel cell system according to claim 1, further comprising:
   a temperature measurement unit configured to measure a temperature of the fuel cell; and
   a temperature adjustment unit configured to perform temperature regulation of the fuel cell.

11. The fuel cell system according to claim 1, further comprising a battery electrically connected to the fuel cell in parallel.

12. The fuel cell system according to claim 1, wherein the fuel electrode, the electrolyte membrane, and the oxidant electrode are laminated in that order in a vertical direction.

13. The fuel cell system according to claim 12, wherein the fuel electrode is disposed below the electrolyte membrane.

* * * * *